US012582959B2

(12) United States Patent
Hasegawa

(10) Patent No.: US 12,582,959 B2
(45) Date of Patent: Mar. 24, 2026

(54) DATA GENERATION DEVICE AND METHOD, AND LEARNING DEVICE AND METHOD

(71) Applicant: FUJIFILM Corporation, Tokyo (JP)

(72) Inventor: Masataka Hasegawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1192 days.

(21) Appl. No.: 17/407,770

(22) Filed: Aug. 20, 2021

(65) Prior Publication Data

US 2021/0390369 A1 Dec. 16, 2021

Related U.S. Application Data

(63) Continuation of application No. PCT/JP2020/008589, filed on Mar. 2, 2020.

(30) Foreign Application Priority Data

Mar. 8, 2019 (JP) ................................. 2019-042363

(51) Int. Cl.
G06N 3/04 (2023.01)
B01J 19/00 (2006.01)
G06F 18/214 (2023.01)

(52) U.S. Cl.
CPC ........ *B01J 19/0033* (2013.01); *G06F 18/214* (2023.01); *G06N 3/04* (2013.01)

(58) Field of Classification Search
CPC ....................................................... G06N 3/04
See application file for complete search history.

(56) References Cited

U.S. PATENT DOCUMENTS

2010/0145896 A1 6/2010 Yuta
2010/0274367 A1 10/2010 Kaufman et al.
(Continued)

FOREIGN PATENT DOCUMENTS

CN 101872166 A 10/2010
CN 107918726 A 4/2018
(Continued)

OTHER PUBLICATIONS

Gasteiger, Johann, and Jure Zupan. "Neural networks in chemistry." Angewandte Chemie International Edition in English 32, No. 4 (1993): 503-527. (Year: 1993).*

(Continued)

*Primary Examiner* — Kakali Chaki
*Assistant Examiner* — Charles Jeffrey Jones
(74) *Attorney, Agent, or Firm* — Studebaker Brackett PLLC

(57) ABSTRACT

A data generation device generates a data set consisting of a plurality of pieces of learning data for training a neural network in which a plurality of layers are connected by a plurality of connection weights, the neural network outputting a production result corresponding to a process condition in a case where the process condition is input in a process for producing a product. At this time, assuming that a total number of the connection weights of the neural network is M0, a plurality of the process conditions of 2×M0 or more are set. In addition, a production result corresponding to each of the plurality of process conditions is acquired, which is derived by producing the product under each of the plurality of process conditions. The plurality of pieces of learning data consisting of the plurality of process conditions and the production result are generated as the data set.

4 Claims, 12 Drawing Sheets

| j | NEURAL NETWORK CONFIGURATION | | | NUMBER OF PIECES OF DATA | | | | |
|---|---|---|---|---|---|---|---|---|
| | NUMBER OF NODES IN INPUT LAYER | NUMBER OF NODES IN HIDDEN LAYER | NUMBER OF NODES IN OUTPUT LAYER | Mj−1 | Mj | Nj/2 | Nj−1 | Nj |
| 0 | 5 | 3 | 2 | — | 21 | 21 | — | 42 |
| 1 | 5 | 3 | 2 | 21 | 21 | 21.5 | 42 | 43 |
| 2 | 5 | 3 | 2 | 21 | 21 | 22 | 43 | 44 |
| 3 | 5 | 3 | 2 | 21 | 21 | 22.5 | 44 | 45 |
| 4 | 5 | 3 | 2 | 21 | 21 | 23 | 45 | 46 |
| 5 | 5 | 3 | 2 | 21 | 21 | 23.5 | 46 | 47 |
| 6 | 5 | 3 | 2 | 21 | 21 | 24 | 47 | 48 |
| 7 | 5 | 3 | 2 | 21 | 21 | 24.5 | 48 | 49 |
| 8 | 5 | 3 | 2 | 21 | 21 | 25 | 49 | 50 |
| 9 | 5 | 3 | 2 | 21 | 21 | 25.5 | 50 | 51 |
| 10 | 5 | 3 | 2 | 21 | 21 | 26 | 51 | 52 |
| 11 | 5 | 3 | 2 | 21 | 21 | 26.5 | 52 | 53 |
| 12 | 5 | 3 | 2 | 21 | 21 | 27 | 53 | 54 |
| 13 | 5 | 3 | 2 | 21 | 21 | 27.5 | 54 | 55 |
| 14 | 5 | 3 | 2 | 21 | 21 | 28 | 55 | 56 |
| 15 | 5 | 4 | 2 | 21 | 28 | 28.5 | 56 | 57 |
| 16 | 5 | 4 | 2 | 28 | 28 | 29 | 57 | 58 |
| 17 | 5 | 4 | 2 | 28 | 28 | 29.5 | 58 | 59 |
| 18 | 5 | 4 | 2 | 28 | 28 | 30 | 59 | 60 |
| 19 | 5 | 4 | 2 | 28 | 28 | 30.5 | 60 | 61 |
| 20 | 5 | 4 | 2 | 28 | 28 | 31 | 61 | 62 |
| 21 | 5 | 4 | 2 | 28 | 28 | 31.5 | 62 | 63 |
| 22 | 5 | 4 | 2 | 28 | 28 | 32 | 63 | 64 |
| 23 | 5 | 4 | 2 | 28 | 28 | 32.5 | 64 | 65 |
| 50 | 5 | 6 | 2 | 42 | 42 | 46 | 91 | 92 |
| 51 | 5 | 6 | 2 | 42 | 42 | 46.5 | 92 | 93 |
| 52 | 5 | 6 | 2 | 42 | 42 | 47 | 93 | 94 |
| 53 | 5 | 6 | 2 | 42 | 42 | 47.5 | 94 | 95 |
| 54 | 5 | 6 | 2 | 42 | 42 | 48 | 95 | 96 |
| 55 | 5 | 6 | 2 | 42 | 42 | 48.5 | 96 | 97 |
| 56 | 5 | 6 | 2 | 42 | 42 | 49 | 97 | 98 |
| 57 | 5 | 7 | 2 | 42 | 49 | 49.5 | 98 | 99 |
| 58 | 5 | 7 | 2 | 49 | 49 | 50 | 99 | 100 |
| 59 | 5 | 7 | 2 | 49 | 49 | 50.5 | 100 | 101 |
| 60 | 5 | 7 | 2 | 49 | 49 | 51 | 101 | 102 |
| 61 | 5 | 7 | 2 | 49 | 49 | 51.5 | 102 | 103 |
| 62 | 5 | 7 | 2 | 49 | 49 | 52 | 103 | 104 |
| 63 | 5 | 7 | 2 | 49 | 49 | 52.5 | 104 | 105 |
| 64 | 5 | 7 | 2 | 49 | 49 | 53 | 105 | 106 |
| 65 | 5 | 7 | 2 | 49 | 49 | 53.5 | 106 | 107 |
| 66 | 5 | 7 | 2 | 49 | 49 | 54 | 107 | 108 |
| 67 | 5 | 7 | 2 | 49 | 49 | 54.5 | 108 | 109 |
| 68 | 5 | 7 | 2 | 49 | 49 | 55 | 109 | 110 |
| 69 | 5 | 7 | 2 | 49 | 49 | 55.5 | 110 | 111 |
| 70 | 5 | 7 | 2 | 49 | 49 | 56 | 111 | 112 |

(56) References Cited

U.S. PATENT DOCUMENTS

| | | | |
|---|---|---|---|
| 2010/0304155 | A1 | 12/2010 | Fujinami et al. |
| 2015/0133306 | A1 | 5/2015 | Cronin |
| 2018/0253629 | A1 | 9/2018 | Bamba |
| 2018/0356793 | A1 | 12/2018 | Kanemaru |
| 2021/0065851 | A1* | 3/2021 | Madrid .................. G16C 20/70 |

FOREIGN PATENT DOCUMENTS

| | | |
|---|---|---|
| CN | 108763857 A | 11/2018 |
| CN | 109032078 A | 12/2018 |
| JP | 2002-301359 A | 10/2002 |
| JP | 2007-052049 A | 3/2007 |
| JP | 2011-006788 A | 1/2011 |
| JP | 2013-129540 A | 7/2013 |
| JP | 2013-161298 A | 8/2013 |
| JP | 2015-520674 A | 7/2015 |
| JP | 2018-148367 A | 9/2018 |
| WO | 2009/025045 A1 | 2/2009 |

OTHER PUBLICATIONS

International Search Report issued in PCT/JP2020/008985; mailed Jun. 9, 2020.
International Preliminary Report on Patentability and Written Opinion issued in PCT/JP2020/008589; issued Aug. 25, 2021.
Iso, Toshiki et al., "Neural Network for Classification of Eye's Shape", IEICE technical report, pp. 65-72, Dec. 14, 1990.
Renata Fortuna et al.; "Optimization Methodology Applied to Feed-Forward Artificial Neural Network Parameters," International Journal of Quantum Chemistry; vol. 111; No. 3; Dec. 15, 2010; pp. 539-553; Wiley, NY, USA.
Yuntian Chen et al.; "Ensemble Neural Networks (ENN: A Gradient-free Stochastic Method," arxiv.org; Aug. 3, 2019; Cornell University Library, Ithaca, NY; pp. 1-43.
The extended European search report issued by the European Patent Office on Mar. 28, 2022, which corresponds to European Patent Application No. 20769853.1-111 and is related to U.S. Appl. No. 17/407,770.
An Office Action mailed by China National Intellectual Property Administration on Aug. 1, 2022, which corresponds to Chinese Patent Application No. 202080019523.4 and is related to U.S. Appl. No. 17/407,770; with English language translation.
An Office Action; "Notice of Reasons for Refusal", mailed by the Japanese Patent Office on Apr. 19, 2022, which corresponds to Japanese Patent Application No. 2021-504931 and is related to U.S. Appl. No. 17/407,770; with English language translation.
Communication pursuant to Article 94(3) EPC issued by the European Patent Office on Jan. 17, 2025, which corresponds to European Patent Application No. 20 769 853.1-1111 and is related to U.S. Appl. No. 17/407,770.
Altissimi, R. et al.; "Optimal Operation of a Separation Plant using Artificial Neural Networks"; Computers & Chemical Engineering; Mar. 15, 1998; pp. S939-S942; vol. 22; Elsevier Science Ltd; Great Britain; XP093237705; GB ISSN: 0098-1354; DOI: 10.1016/S0098-1354(98)00185-9; URL: https://www.sciencedirect.com/science/article/pii/S0098135498001859.
Alwosheel, A. et al.; "Is your dataset big enough? Sample size requirements when using artificial neural networks for discrete choice analysis"; Journal of Choice Modelling; Sep. 1, 2018; pp. 167-182; vol. 28; Elsevier Ltd; XP093237608; ISSN: 1755-5345; DOI: 10.1016/j.jocm.2018.07.002; URL: https://www.sciencedirect.com/science/article/pii/S1755534518300058.

* cited by examiner

FIG. 5

| LEARNING DATA No. | REACTION CONDITION | | | | | REACTION RESULT | |
| | FIRST RAW MATERIAL | SECOND RAW MATERIAL | MERGING PORTION | REACTION PORTION | REACTION TEMPERATURE (°C) | PRODUCT | |
| | FLOW RATE (mL/min) | FLOW RATE (mL/min) | SHAPE | REACTION PATH DIAMETER (mm) | | DISPERSITY | MOLECULAR WEIGHT |
|---|---|---|---|---|---|---|---|
| 1 | 10 | 5.5 | T SHAPE | 1 | 0 | 1.0422 | 27000 |
| 2 | 20 | 11 | T SHAPE | 1 | 10 | 1.1334 | 21340 |
| 3 | 100 | 55 | T SHAPE | 10 | 10 | 1.0575 | 22000 |
| 4 | 11 | 5.6 | T SHAPE | 5 | 10 | 1.0560 | 25200 |
| 5 | 20 | 11 | T SHAPE | 5 | 10 | 1.0631 | 28300 |
| 6 | 20 | 11 | T SHAPE | 1 | 10 | 1.0655 | 18000 |
| 7 | 20 | 20 | CROSS SHAPE | 2 | 0 | 1.1164 | 22300 |
| 8 | 20 | 20 | T SHAPE | 2 | 0 | 1.2328 | 14900 |
| 9 | 20 | 20 | T SHAPE | 4 | 0 | 1.0845 | 23500 |
| 10 | 1 | 0.6 | T SHAPE | 1 | 0 | 1.0431 | 11560 |
| ... | | | | | | | |
| 42 | 20 | 20 | CROSS SHAPE | 2 | 2 | 1.1164 | 23300 |

FIG. 7

| REACTION CONDITION | | | | |
|---|---|---|---|---|
| FIRST RAW MATERIAL | SECOND RAW MATERIAL | MERGING PORTION | REACTION PORTION | REACTION TEMPERATURE (°C) |
| FLOW RATE (mL/min) | FLOW RATE (mL/min) | SHAPE | REACTION PATH DIAMETER (mm) | |
| 1 | 0.6 | T SHAPE | 1 | 0 |
| 2 | 0.6 | T SHAPE | 1 | 0 |
| 3 | 0.6 | T SHAPE | 1 | 0 |
| ⋮ | ⋮ | ⋮ | ⋮ | ⋮ |
| 100 | 0.6 | T SHAPE | 1 | 0 |
| 1 | 0.7 | T SHAPE | 1 | 0 |
| 1 | 0.8 | T SHAPE | 1 | 0 |
| ⋮ | ⋮ | ⋮ | ⋮ | ⋮ |
| 1 | 55.0 | T SHAPE | 1 | 0 |
| 1 | 0.6 | CROSS SHAPE | 1 | 0 |
| 2 | 0.6 | CROSS SHAPE | 1 | 0 |
| 3 | 0.6 | CROSS SHAPE | 1 | 0 |
| ⋮ | ⋮ | ⋮ | ⋮ | ⋮ |

FIG. 8

| LEARNING DATA No. | REACTION CONDITION | | | | | REACTION RESULT | |
| | FIRST RAW MATERIAL FLOW RATE (mL/min) | SECOND RAW MATERIAL FLOW RATE (mL/min) | MERGING PORTION SHAPE | REACTION PORTION REACTION PATH DIAMETER (mm) | REACTION TEMPERATURE (°C) | PRODUCT DISPERSITY | PRODUCT MOLECULAR WEIGHT |
|---|---|---|---|---|---|---|---|
| 1 | 1 | 0.6 | T SHAPE | 1 | 0 | 1.07453 | 29876 |
| 2 | 2 | 0.6 | T SHAPE | 1 | 0 | 1.07488 | 29654 |
| 3 | 3 | 0.6 | T SHAPE | 1 | 0 | 1.07323 | 29403 |
| ... | ... | ... | ... | ... | ... | ... | ... |
| 100 | 100 | 0.6 | T SHAPE | 1 | 0 | 1.09234 | 29560 |
| 101 | 1 | 0.7 | T SHAPE | 1 | 0 | 1.06832 | 28338 |
| 102 | 1 | 0.8 | T SHAPE | 1 | 0 | 1.06555 | 28762 |
| ... | | | | | | ... | ... |
| ... | 3 | 10.2 | CROSS SHAPE | 2 | 0 | 1.05743 | 27835 |
| | 3 | 10.3 | CROSS SHAPE | 2 | 0 | 1.05464 | 27856 |
| | 3 | 10.4 | CROSS SHAPE | 2 | 0 | 1.05382 | 27832 |
| | ... | | ... | | ... | ... | ... |
| 6050 * | 8 | 3.2 | T SHAPE | 6 | 0 | 1.0389 | 24870 |
| ... | ... | ... | ... | | ... | ... | ... |
| 8000 | 10 | 3.2 | T SHAPE | 6 | 0 | 1.05702 | 24870 |
| ... | ... | ... | ... | | ... | ... | ... |

FIG. 9

| PREDICTION INFORMATION No. | REACTION CONDITION | | | | | | REACTION RESULT | |
|---|---|---|---|---|---|---|---|---|
| | FIRST RAW MATERIAL | SECOND RAW MATERIAL | MERGING PORTION | REACTION PORTION | REACTION TEMPERATURE (°C) | | PRODUCT | |
| | FLOW RATE (mL/min) | FLOW RATE (mL/min) | SHAPE | REACTION PATH DIAMETER (mm) | | | DISPERSITY | MOLECULAR WEIGHT |
| PREDICTION RESULT RP | 8 | 3.2 | T SHAPE | 6 | 0 | | 1.0389 | 24870 |
| MEASUREMENT RESULT RR | 8 | 3.2 | T SHAPE | 6 | 0 | | 1.0767 | 27630 |

DEGREE OF DIFFERENCE = 3.5107

DEGREE OF DIFFERENCE = 9.9891

FIG. 12

| | NUMBER OF PIECES OF LEARNING DATA | COEFFICIENT OF DETERMINATION $R^2$ (DISPERSITY) | COEFFICIENT OF DETERMINATION $R^2$ (MOLECULAR WEIGHT) | DETERMINATION |
|---|---|---|---|---|
| EXAMPLE 1 | 250 | 0.85 | 0.89 | ACCEPTABLE |
| EXAMPLE 2 | 100 | 0.83 | 0.85 | ACCEPTABLE |
| EXAMPLE 3 | 42 | 0.82 | 0.83 | ACCEPTABLE |
| COMPARATIVE EXAMPLE | 10 | 0.23 | 0.32 | UNACCEPTABLE |

FIG. 13

| j | NEURAL NETWORK CONFIGURATION | | | | | NUMBER OF PIECES OF DATA | | |
|---|---|---|---|---|---|---|---|---|
| | NUMBER OF NODES IN INPUT LAYER | NUMBER OF NODES IN HIDDEN LAYER | NUMBER OF NODES IN OUTPUT LAYER | $M_{j-1}$ | $M_j$ | $N_j/2$ | $N_{j-1}$ | $N_j$ |
| 0 | 5 | 3 | 2 | — | 21 | 21 | — | 42 |
| 1 | 5 | 3 | 2 | 21 | 21 | 21.5 | 42 | 43 |
| 2 | 5 | 3 | 2 | 21 | 21 | 22 | 43 | 44 |
| 3 | 5 | 3 | 2 | 21 | 21 | 22.5 | 44 | 45 |
| 4 | 5 | 3 | 2 | 21 | 21 | 23 | 45 | 46 |
| 5 | 5 | 3 | 2 | 21 | 21 | 23.5 | 46 | 47 |
| 6 | 5 | 3 | 2 | 21 | 21 | 24 | 47 | 48 |
| 7 | 5 | 3 | 2 | 21 | 21 | 24.5 | 48 | 49 |
| 8 | 5 | 3 | 2 | 21 | 21 | 25 | 49 | 50 |
| 9 | 5 | 3 | 2 | 21 | 21 | 25.5 | 50 | 51 |
| 10 | 5 | 3 | 2 | 21 | 21 | 26 | 51 | 52 |
| 11 | 5 | 3 | 2 | 21 | 21 | 26.5 | 52 | 53 |
| 12 | 5 | 3 | 2 | 21 | 21 | 27 | 53 | 54 |
| 13 | 5 | 3 | 2 | 21 | 21 | 27.5 | 54 | 55 |
| 14 | 5 | 3 | 2 | 21 | 21 | 28 | 55 | 56 |
| 15 | 5 | 4 | 2 | 21 | 28 | 28.5 | 56 | 57 |
| 16 | 5 | 4 | 2 | 28 | 28 | 29 | 57 | 58 |
| 17 | 5 | 4 | 2 | 28 | 28 | 29.5 | 58 | 59 |
| 18 | 5 | 4 | 2 | 28 | 28 | 30 | 59 | 60 |
| 19 | 5 | 4 | 2 | 28 | 28 | 30.5 | 60 | 61 |
| 20 | 5 | 4 | 2 | 28 | 28 | 31 | 61 | 62 |
| 21 | 5 | 4 | 2 | 28 | 28 | 31.5 | 62 | 63 |
| 22 | 5 | 4 | 2 | 28 | 28 | 32 | 63 | 64 |
| 23 | 5 | 4 | 2 | 28 | 28 | 32.5 | 64 | 65 |
| 50 | 5 | 6 | 2 | 42 | 42 | 46 | 91 | 92 |
| 51 | 5 | 6 | 2 | 42 | 42 | 46.5 | 92 | 93 |
| 52 | 5 | 6 | 2 | 42 | 42 | 47 | 93 | 94 |
| 53 | 5 | 6 | 2 | 42 | 42 | 47.5 | 94 | 95 |
| 54 | 5 | 6 | 2 | 42 | 42 | 48 | 95 | 96 |
| 55 | 5 | 6 | 2 | 42 | 42 | 48.5 | 96 | 97 |
| 56 | 5 | 6 | 2 | 42 | 42 | 49 | 97 | 98 |
| 57 | 5 | 7 | 2 | 42 | 49 | 49.5 | 98 | 99 |
| 58 | 5 | 7 | 2 | 49 | 49 | 50 | 99 | 100 |
| 59 | 5 | 7 | 2 | 49 | 49 | 50.5 | 100 | 101 |
| 60 | 5 | 7 | 2 | 49 | 49 | 51 | 101 | 102 |
| 61 | 5 | 7 | 2 | 49 | 49 | 51.5 | 102 | 103 |
| 62 | 5 | 7 | 2 | 49 | 49 | 52 | 103 | 104 |
| 63 | 5 | 7 | 2 | 49 | 49 | 52.5 | 104 | 105 |
| 64 | 5 | 7 | 2 | 49 | 49 | 53 | 105 | 106 |
| 65 | 5 | 7 | 2 | 49 | 49 | 53.5 | 106 | 107 |
| 66 | 5 | 7 | 2 | 49 | 49 | 54 | 107 | 108 |
| 67 | 5 | 7 | 2 | 49 | 49 | 54.5 | 108 | 109 |
| 68 | 5 | 7 | 2 | 49 | 49 | 55 | 109 | 110 |
| 69 | 5 | 7 | 2 | 49 | 49 | 55.5 | 110 | 111 |
| 70 | 5 | 7 | 2 | 49 | 49 | 56 | 111 | 112 |

DATA GENERATION DEVICE AND METHOD, AND LEARNING DEVICE AND METHOD

CROSS-REFERENCE TO RELATED APPLICATIONS

This application is a Continuation of PCT international Application No. PCT/JP2020/008589 filed on Mar. 2, 2020, which claims priority under 35 U.S.C § 119(a) to Japanese Patent Application No. 2019-042363 filed on Mar. 8, 2019. Each of the above application(s) is hereby expressly incorporated by reference, in its entirety, into the present application.

BACKGROUND OF THE INVENTION

1. Field of the Invention

The present disclosure relates to a data generation device and method, and a learning device and method.

2. Description of the Related Art

As methods for reacting a raw material containing a reactant, there are a so-called batch method in which the raw material is reacted in a state of being accommodated in a container, and a continuous method in which the raw material is reacted while the raw material is flowing. The continuous reaction is called a flow reaction since the reaction is performed while the raw material is flowing. In a flow reaction process, since the reaction is continuously carried out, a product can be easily obtained with uniform properties. Further, the flow reaction process has an advantage that the productivity is higher than that of the batch method.

Incidentally, a method of utilizing various computations using a neural network, for example, has been proposed for a chemical reaction process. For example, in JP2002-301359A, data under an abnormal state of each measurement device of a chemical reactor is calculated by a neural network that stores the data in advance in a program by training. Further, in a case where the calculation value deviates from a set normal allowable band value, an abnormal signal is output to a neuro controller, and a correction control signal is sent to each part of the chemical reactor, to thereby control the abnormal reaction. Thus, the abnormal state of the chemical reactor is immediately detected, and a quick and accurate control is performed.

WO2009/025045A discloses, as a method of predicting physical properties of a compound, a technique of applying a created prediction model to an unknown sample to calculate prediction items. In this technique, the degree of similarity between the unknown sample and an individual learning sample is calculated based on a plurality of parameter values acquired for the unknown sample and the individual learning sample, and learning samples having a degree of similarity equal to or higher than a preset threshold value are extracted to form a sub-sample set. Then, data analysis of the sub-sample set is performed to create a prediction model, and this prediction model is applied to the unknown sample to calculate prediction items. Further, in JP2015-520674A, a flow reaction is controlled by using a genetic algorithm, thereby producing a target product.

SUMMARY OF THE INVENTION

In the flow reaction process, the reaction is performed while the raw material is flowing, so that it is usually more difficult to find the optimum reaction conditions than in the batch reaction process. This is because the flow reaction has condition parameters such as a flow velocity or a flow rate that are unique to the flow reaction.

Such a flow reaction having many condition parameters requires a lot of trials and time for setting conditions before starting a new reaction process, and is particularly remarkable in a condition search in a new reaction system. Further, even in a case where one of a plurality of condition parameters has to be changed for some reason, it is not easy to determine which of the other condition parameters should be changed. Therefore, it is conceivable to set more preferable conditions by training the neural network using the data whose reaction result is known as learning data.

On the other hand, in a case of training a neural network, the more learning data there is, the better the learning accuracy is. However, in a production process for producing a product such as a flow reaction process, a large amount of raw materials are required in order to prepare a large amount of learning data. In addition, while the learning data is prepared, a production facility is occupied for the preparation of the learning data. In addition, some reaction processes require a long time. As described above, in a production process such as a flow reaction process, it is difficult to prepare a large amount of learning data due to restrictions on raw materials, a facility, and a reaction process. On the other hand, unless a certain number of pieces of learning data are prepared, the neural network cannot be trained accurately. In a case where the neural network cannot be trained accurately, the conditions for the production process cannot be set appropriately.

The present disclosure has been made in view of the above circumstances, and an object of the present disclosure is to enable appropriate setting of conditions for the production process.

According to an aspect of the present disclosure, there is provided a data generation device that generates a data set consisting of a plurality of pieces of learning data for training a neural network in which a plurality of layers are connected by a plurality of connection weights, the neural network outputting a production result corresponding to a process condition in a case where the process condition is input in a process for producing a product, the data generation device comprising: a process condition setting unit configured to, assuming that a total number of the connection weights of the neural network is $M0$, set a plurality of the process conditions of $2 \times M0$ or more; a production result acquisition unit configured to acquire a production result corresponding to each of the plurality of process conditions, which is derived by producing the product under each of the plurality of process conditions; and a generation unit configured to generate the plurality of pieces of learning data consisting of each of the plurality of process conditions and the production result corresponding to the process condition as the data set.

In the data generation device according to the aspect of the present disclosure, the process condition setting unit may set a plurality of the process conditions of $2 \times M0$ or more and $10 \times M0$ or less.

In the data generation device according to the aspect of the present disclosure, the process condition setting unit may set an upper limit and a lower limit of the process condition.

In the data generation device according to the aspect of the present disclosure, the process may be a flow reaction process for producing the product by reacting a raw material while the raw material is flowing.

According to another aspect of the present disclosure, there is provided a first learning device for training a neural network in which a plurality of layers are connected by a plurality of connection weights, the neural network outputting a production result corresponding to a process condition in a case where the process condition is input in a process for producing a product, the first learning device comprising: a first computing unit configured to perform a first computation for deriving the connection weight of the neural network by using the data set generated by the data generation device according to the aspect of the present disclosure; a second computing unit configured to perform a second computation for calculating a prediction result for each process condition of a condition data set having a plurality of process conditions whose production results are unknown using the neural network in which the connection weight is computed to generate a prediction data set in which the process condition and the prediction result are associated with each other, specifying the prediction result closest to a preset target result among a plurality of the obtained prediction results, and extracting a process condition associated with the specified prediction result as an extracted process condition; and a determination unit configured to, assuming that the number of the data sets is Nj and the number of the connection weights of the neural network is Mj, determine whether or not a degree of difference between the production result in a case where the product is produced under the extracted process condition and the prediction result associated with the extracted process condition is within a preset allowable range, and in a case where the determination is negative, update the number Nj of the data sets by adding, to the data set, production information in which the extracted process condition is associated with the production result in a case where the production is performed under the extracted process condition as the learning data, and update the number Mj of new connection weights of the neural network so that $Mj-1 \leq Mj < Nj/2$, and in a case Where the determination is positive, determine that the extracted process condition is a process condition used for the process, in which the first computation, the second computation, and the determination are repeated until the determination is positive based on the updated data set and the neural network whose connection weights are updated.

According to another aspect of the present disclosure, there is provided a second learning device for training a neural network in which a plurality of layers are connected by a plurality of connection weights, the neural network outputting a production result corresponding to a process condition in a case where the process condition is input in a process for producing a product, the second learning device comprising: a first computing unit configured to perform a first computation for deriving the connection weight of the neural network by using a data set consisting of a plurality of pieces of learning data consisting of each of the plurality of process conditions and the production result corresponding to the process condition; a second computing unit configured to perform a second computation for calculating a prediction result for each process condition of a condition data set having a plurality of process conditions whose production results are unknown using the neural network in which the connection weight is computed to generate a prediction data set in which the process condition and the prediction result are associated with each other, specifying the prediction result closest to a preset target result among a plurality of the obtained prediction results, and extracting a process condition associated with the specified prediction result as an extracted process condition; and a determination unit configured to, assuming that the number of the data sets is Nj and the number of the connection weights of the neural network is Mj, determine whether or not a degree of difference between the production result in a case where the product is produced under the extracted process condition and the prediction result associated with the extracted process condition is within a preset allowable range, and in a case where the determination is negative, update the number Nj of the data sets by adding, to the data set, production information in which the extracted process condition is associated with the production result in a case where the production is performed under the extracted process condition as the learning data, and update the number Mj of new connection weights of the neural network so that $Mj-1 \leq Mj < Nj/2$, and in a case where the determination is positive, determine that the extracted process condition is a process condition used for the process, in which the first computation, the second computation, and the determination are repeated until the determination is positive based on the updated data set and the neural network whose connection weights are updated.

In the first or second learning device according to the aspect of the present disclosure, the process may be a flow reaction process for producing the product by reacting a raw material while the raw material is flowing.

According to another aspect of the present disclosure, there is provided a data generation method for generating a data set consisting of a plurality of pieces of learning data for training a neural network in which a plurality of layers are connected by a plurality of connection weights, the neural network outputting a production result corresponding to a process condition in a case where the process condition is input in a process for producing a product, the data generation method comprising: assuming that a total number of the connection weights of the neural network is M0, setting a plurality of the process conditions of $2 \times M0$ or more; acquiring a production result corresponding to each of the plurality of process conditions, which is derived by producing the product under each of the plurality of process conditions; and generating the plurality of pieces of learning data consisting of each of the plurality of process conditions and the production result corresponding to the process condition as the data set.

According to another aspect of the present disclosure, there is provided a first learning method for training a neural network in which a plurality of layers are connected by a plurality of connection weights, the neural network outputting a production result corresponding to a process condition in a case where the process condition is input in a process for producing a product, the first learning method comprising: performing a first computation for deriving the connection weight of the neural network by using the data set generated by the data generation method according to the aspect of the present disclosure; performing a second computation for calculating a prediction result for each process condition of a condition data set having a plurality of process conditions whose production results are unknown using the neural network in which the connection weight is computed to generate a prediction data set in which the process condition and the prediction result are associated with each other, specifying the prediction result closest to a preset target result among a plurality of the obtained prediction results, and extracting a process condition associated with the specified prediction result as an extracted process condition; and assuming that the number of the data sets is Ni and the number of the connection weights of the neural network is Mj, determining whether or not a degree of difference between the production result in a case where the product is produced under the extracted process condition and the prediction result associated with the extracted process condition is within a preset allowable range, and in a case where the determination is negative, updating the number Nj of the data sets by adding, to the data set, production information in which the extracted process condition is associated with the production result in a case where the production is performed under the extracted process condition as the learning data, and updating the number Mj of new connection weights of the neural network so that $Mj-1 \leq Mj \leq Nj/2$, and in a case where the determination is positive, determining that the extracted process condition is a process condition used for the process, in which the first computation, the second computation, and the determination are repeated until the determination is positive based on the updated data set and the neural network whose connection weights are updated.

According to another aspect of the present disclosure, there is provided a second learning method for training a neural network in which a plurality of layers are connected by a plurality of connection weights, the neural network outputting a production result corresponding to a process condition in a case where the process condition is input in a process for producing a product, the second learning method comprising: performing a first computation for deriving the connection weight of the neural network by using a data set consisting of a plurality of pieces of learning data consisting of each of the plurality of process conditions and the production result corresponding to the process condition; performing a second computation for calculating a prediction result for each process condition of a condition data set having a plurality of process conditions whose production results are unknown using the neural network in which the connection weight is computed to generate a prediction data set in which the process condition and the prediction result are associated with each other, specifying the prediction result closest to a preset target result among a plurality of the obtained prediction results, and extracting a process condition associated with the specified prediction result as an extracted process condition; and assuming that the number of the data sets is Nj and the number of the connection weights of the neural network is Mj, determining whether or not a degree of difference between the production result in a case where the product is produced under the extracted process condition and the prediction result associated with the extracted process condition is within a preset allowable range, and in a case where the determination is negative, updating the number Nj of the data sets by adding, to the data set, production information in which the extracted process condition is associated with the production result in a case where the production is performed under the extracted process condition as the learning data, and updating the number Mj of new connection weights of the neural network so that $Mj-1 \leq Mj < Nj/2$, and in a case where the determination is positive, determining that the extracted process condition is a process condition used for the process, in which the first computation, the second computation, and the determination are repeated until the determination is positive based on the updated data set and the neural network whose connection weights are updated.

According to the aspects of the present disclosure, the conditions for the production process can be appropriately set.

BRIEF DESCRIPTION OF THE DRAWINGS

FIG. 5 is an explanatory diagram of an initial data set.

FIG. 7 is an explanatory diagram of a condition data set.

FIG. 8 is an explanatory diagram of a prediction data set.

FIG. 9 is an explanatory diagram of comparison data.

FIG. 12 is a diagram showing a verification result of learning accuracy of a neural network in the present embodiment.

FIG. 13 is a diagram showing a relationship between the number of pieces of learning data included in a data set in the present embodiment and the number of neural network connections.

DESCRIPTION OF THE PREFERRED EMBODIMENTS

Figure 1:
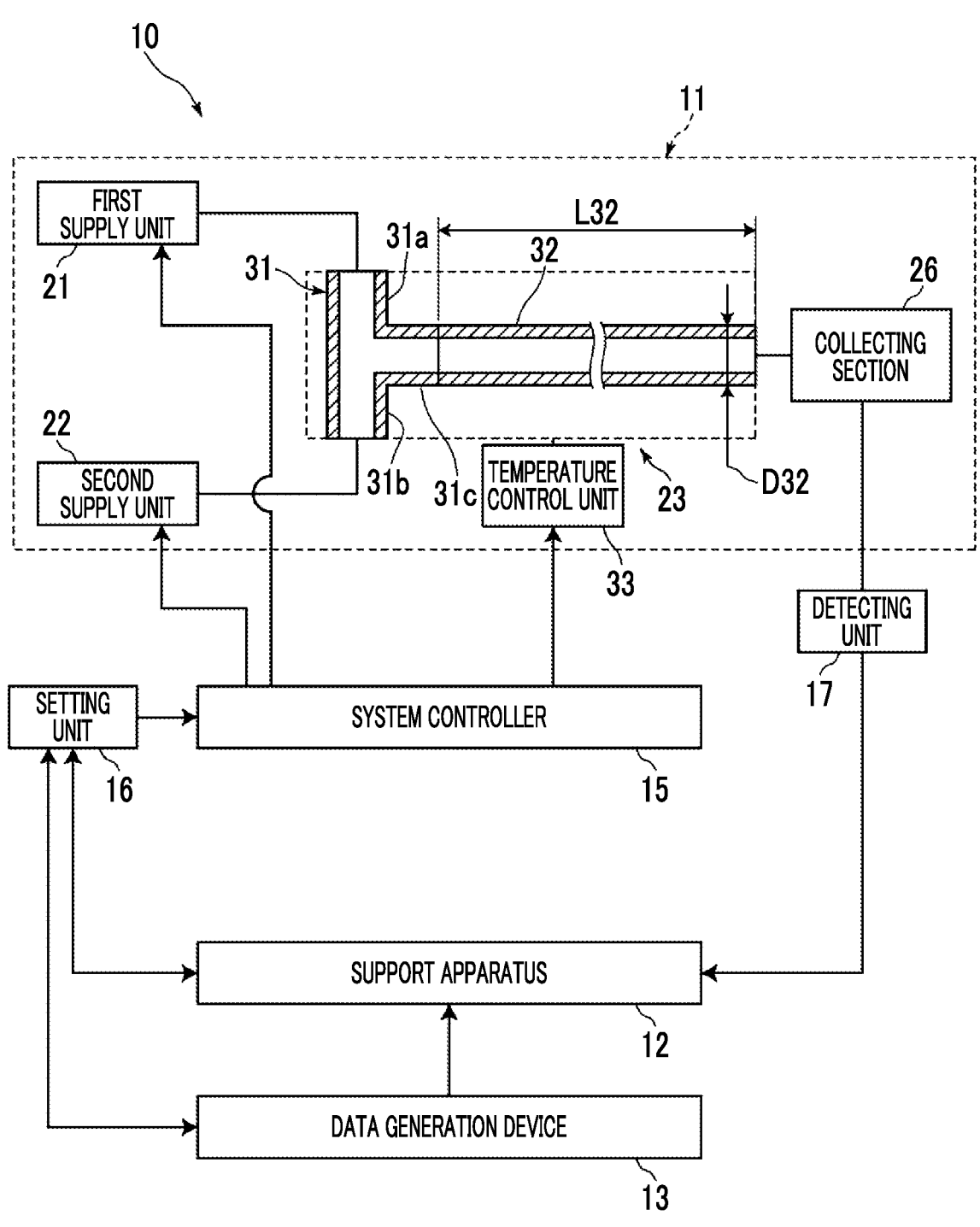
FIG. 1 is a schematic diagram showing a flow reaction facility.

Hereinafter, embodiments of the present disclosure will be described with reference to the drawings. FIG. 1 is a diagram showing a flow reaction facility which is one aspect of a production process facility to which a data generation device and a learning device according to an embodiment of the present disclosure are applied. As shown in FIG. 1, a flow reaction facility 10 comprises a flow reactor 11, a flow reaction support apparatus (hereinafter, simply referred to as a "support apparatus") 12, a data generation device 13, a system controller 15, a setting unit 16, a detecting unit 17, and the like. The flow reactor 11 is an apparatus that performs a flow reaction process to obtain a product.

The flow reaction performed in the flow reactor 11 may be, for example, a synthesis reaction for synthesizing a compound that is a monomer, or a polymerization reaction for producing a polymer by reacting monomers, or may be elementary reactions such as an initiation reaction and a termination reaction in an anionic polymerization reaction, for example. Accordingly, a reactant that is a target of the flow reaction may be, for example, a vegetation (growth) stage compound that is a target of the termination reaction. In the present embodiment, the termination reaction of stopping the vegetation (growth) of polystyryllithium with methanol is performed by the flow reaction.

The flow reactor 11 comprises a first supply unit 21, a second supply unit 22, a reaction section 23, and a collecting section 26. The first supply unit 21 and the second supply unit 22 are respectively connected to upstream end parts of the reaction section 23 by piping, and the collecting section 26 is connected to a downstream end part of the reaction section 23 by piping.

The first supply unit 21 is a member for supplying a first raw material of the flow reaction to the reaction section 23. The first raw material in the present embodiment is a first liquid obtained by dissolving polystyryllithium in a solvent, and polystyryllithium is an example of a reactant of the flow reaction process. In the present embodiment, the first supply unit 21 supplies the first liquid obtained by dissolving polystyryllithium in the solvent to the reaction section 23. Tetrahydrofuran (hereinafter, referred to as THF) is used as the solvent, and a small amount of toluene and hexane are mixed in the first liquid. In this way, the raw material of the flow reaction may be a mixture of the reactant and another substance, or may be formed of only the reactant. The first supply unit 21 comprises a pump (not shown), and a flow rate of the first raw material to the reaction section 23 is controlled by controlling a rotating speed of the pump.

The second supply unit 22 is a member for supplying a second raw material of the flow reaction to the reaction section 23. The second raw material in the present embodiment is a mixture of methanol and water, that is, an aqueous methanol solution, and methanol is used as a terminating agent for the termination reaction. The second supply unit 22 also comprises a pump (not shown) like the first supply unit 21, and a flow rate of methanol to the reaction section 23 is controlled by controlling a rotating speed of the pump. In the present embodiment, the first supply unit 21 and the second supply unit 22 supply a liquid to the reaction section 23, but the supply is not limited to the liquid and may be a solid or a gas.

The reaction section 23 is a member for performing a termination reaction as a flow reaction, and comprises a merging portion 31, a reaction portion 32, and a temperature control unit 33. The merging portion 31 is a T-shaped branched tube, that is, a T-shaped tube. A first tube part 31*a* of the merging portion 31 is connected to the first supply unit 21, a second tube part 31*b* thereof is connected to the second supply unit 22, and a third tube part 31*c* thereof is connected to the reaction portion 32. Thus, the guided first raw material and second raw material merge with each other and are sent to the reaction portion 32 in a mixed state.

The reaction portion 32 is a tube in which a plurality of tubular members are connected in the length direction. A length L32 of the reaction portion 32 is changed by changing at least one of the number of tubular members or the length of each tubular member that is used. Further, a reaction path diameter D32, which is an inner diameter of the reaction portion 32, is changed by changing the tubular members to other tubular members having a different inner diameter.

The inside of the reaction portion 32 is a flow path for a mixture hereinafter, referred to as a mixed raw material) of the first raw material and the second raw material, and a hollow portion in the tube is defined as a reaction site. The mixed raw material undergoes an anionic polymerization termination reaction while passing through the reaction portion 32, so that polystyrene is produced. The reaction also proceeds slightly in the third tube part 31*c* of the merging portion 31, but the length of the third tube part 31*c* of the merging portion 31 is very short with respect to the length L32 (in the present embodiment, 8 m) of the reaction portion 32, which is approximately 0.03 m in the present embodiment. Accordingly, the length of the third tube part 31*c* is ignored, and the length L32 of the reaction portion 32 is regarded as the length of a site where the flow reaction is performed (hereinafter, referred to as a reaction path length). Hereinafter, the reference numeral L32 is used for the reaction path length. Similarly, the inner diameter D32 of the reaction portion 32 is regarded as the diameter of the site where the flow reaction is performed (hereinafter, referred to as a reaction path diameter), and the reference numeral D32 is used for the reaction path diameter.

The temperature control unit 33 is a member for controlling a temperature of the flow reaction (hereinafter, referred to as a reaction temperature). The temperature control unit 33 controls the temperature (reaction temperature) of the mixed raw material flowing in and through the merging portion 31 and the reaction portion 32. In a case where the reaction temperature set by the setting unit 16 (hereinafter referred to as a set temperature) and the temperature of the mixed raw material controlled by the temperature control unit 33 are the same, the set temperature may be regarded as the reaction temperature, and this is also the case in the present embodiment. In a case where the difference between the set temperature and the temperature of the mixed raw material is large, for example, a temperature detector for detecting the temperature may be provided in the reaction portion 32 or the like, and the detection result of this temperature detector may be used as the reaction temperature.

The collecting section 26 is a member for collecting polystyrene that is a product of the flow reaction. The collecting section 26 includes a precipitating part, a sampling part, a drying part, and the like (all not shown). The precipitating part is a member for precipitating polystyrene, which is a product. In the present embodiment, a container equipped with a stirrer is used as the precipitating part. In a state where methanol is accommodated and stirred in a container, and polystyrene is precipitated by putting a polystyrene solution guided from the reaction section into the methanol.

The sampling part is a member for sampling the precipitated polystyrene from a mixed solution of methanol, THF, and the like. In the present embodiment, a filter is used as the sampling part.

The drying part is a member for drying the sampled polystyrene. In the present embodiment, a constant-temperature tank having a pressure reducing function is used as the drying part. Polystyrene may be obtained by heating the inside of the constant-temperature tank in a decompressed state.

The reaction section and the collecting section are not limited to the above examples, and may be appropriately changed depending on at least one of the type of the flow reaction or the type of the product. For example, a container may be provided in place of the collecting section 26, and the polystyrene solution guided from the reaction section 23 may be temporarily stored in this container. In this case, for example, the stored polystyrene solution is guided to the collecting section 26, and the product may be obtained by precipitating, sampling, and drying the polystyrene.

The detecting unit 17 is connected to the collecting section 26 and the support apparatus 12, detects a reaction result that is a processing result of the flow reaction, and outputs the result to a determination unit 56 (see FIG. 6) of the support apparatus 12. The reaction result corresponds to the production result of the present disclosure. Examples of parameters corresponding to the reaction result (hereinafter, referred to as "result parameters") include properties and states of a product such as a purity, a molecular weight, or a molecular weight dispersity (hereinafter, simply referred to as a dispersity) of the product, a yield of the product, and the like. In addition, in a case where the product is obtained in the collecting section 26 in a solution state in which the product is dissolved in a solvent, for example, the concentration of the product in the solution (molar concentration or the like) may be detected as a result parameter. In addition to the various properties and states of the product, the detecting unit 17 may detect a yield or various properties and states such as a purity of a by-product as result parameters. A plurality of result parameters may form the reaction result.

In the present embodiment, the detecting unit 17 detects the molecular weight and the dispersity of polystyrene obtained in the collecting section 26. That is, the result parameters in the present embodiment are two parameters of the molecular weight and the dispersity. The detected molecular weight is a number-average molecular weight (Mn). The molecular weight and the dispersity are determined by dissolving polystyrene in THF to prepare a polystyrene solution and using this polystyrene solution by gel permeation chromatography (hereinafter, referred to as GPC (GPC is an abbreviation for Gel Permeation Chromatography)). The dispersity is Mw/Mn obtained by dividing a weight average molecular weight (Mw) by the number-average molecular weight. The detection of the result parameters is not limited to GPC. For example, the detection of the result parameters may be performed by various methods such as infrared spectroscopy (IR), nuclear magnetic resonance spectroscopy (NMR), high performance liquid chromatography (HPLC), or gas chromatography (GC).

GPC is measured under the following conditions.

Apparatus: HLC-8220GPC (manufactured by Tosoh Corporation)

Detector: Differential refractometer (Refractive Index (RI) detector)

Pre-column: TSKGUARDCOLUMN HXL-L 6 mm×40 mm (manufactured by Tosoh Corporation)

Sample side column: Direct connection of the following three columns (1) to (3) (all manufactured by Tosoh Corporation)

(1) TSK-GEL GMHXL 7.8 mm×300 mm (2) TSK-GEL G4000HXL 7.8 mm×300 mm (3) TSK-GEL G2000HXL 7.8 mm×300 mm

Reference side column: TSK-GEL G1000HXL 7.8 mm×300 mm

Constant-temperature tank temperature: 40° C.

Moving-layer: THF

Sample side moving-layer flow rate: 1.0 mL/min

Reference side moving-layer flow rate: 1.0 mL/min

Sample concentration: 0.1% by mass

Sample injection volume: 100 μL

Data sampling time: 5 to 45 minutes after sample injection

Sampling pitch: 300 msec

The system controller 15 generally controls the flow reactor 11. The system controller 15 is connected to each of the pumps of the first supply unit 21 and the second supply unit 22, and the temperature control unit 33. The system controller 15 controls the respective flow rates of the first raw material and the second raw material by respectively controlling the rotating speeds of the pumps of the first supply unit 21 and the second supply unit 22, to thereby control the respective flow velocities of the first raw material and the second raw material toward the reaction section 23. Note that the flow velocity of the first raw material is calculated by X1/X2, where the flow rate of the first raw material sent from the first supply unit 21 to the reaction section 23 is X1 (having a unit of m³/sec) and the cross-sectional area of the pipe between the first supply unit 21 and the reaction section 23 is X2 (having a unit of m²). Similarly, the flow velocity of the second raw material is calculated by X1/X2, where the flow rate of the second raw material sent from the second supply unit 22 to the reaction section 23 is X1 and the cross-sectional area of the pipe between the second supply unit 22 and the reaction section 23 is X2 (having a unit of m²). The flow rates of the first raw material and the second raw material are obtained from the rotating speeds based on catalog data of the respective pumps that are commercially available in the present embodiment. Further, the system controller 15 controls the temperature of the mixed raw material by controlling the temperature control unit 33. In this way, the system controller 15 generally controls the flow reactor 11 by controlling each unit of the flow reactor 11.

The setting unit 16 is a member for setting a processing condition (hereinafter, referred to as a reaction condition) of the flow reaction process in the flow reactor 11. The reaction condition corresponds to the process condition of the present disclosure. The reaction condition is a combination of a plurality of condition parameters. The setting unit 16 has an operating unit (not shown), sets reaction condition by input of an operating signal through the operating unit, to thereby control the flow reactor 11 to the set reaction condition through the system controller 15. For example, the reaction condition is set by click or selection using a mouse in the operating unit and/or input of characters using a keyboard. The setting unit 16 is connected to the support apparatus 12, and in addition to or instead of the operating signal through the operating unit, the reaction condition is set to a determined reaction condition CS to be described later read from a third storage unit 51c to be described later of the support apparatus 12, and thus, the support apparatus 12 controls the flow reactor 11 to the predetermined reaction condition through the system controller 15. The setting unit 16 in the present embodiment can also provide an input signal to the support apparatus 12 as described later.

The condition parameters set by the setting unit 16 may be determined according to the type of the flow reaction process to be performed, and are not particularly limited. For example, the condition parameters may include at least one of the flow rate and flow velocity of the raw materials such as the first raw material and the second raw material, the temperature of the raw materials to be fed into the reaction section 23, the reaction temperature, the reaction time, and the like. In the present embodiment, the condition parameters are the flow rate of the first raw material, the flow rate of the second raw material, the shape of the merging portion, the reaction path diameter D32, the reaction path length L32, and the reaction temperature.

The condition parameters of the flow reaction process may include condition parameters fixed to predetermined constant value (hereinafter, referred to as fixed parameters). The fixed parameters of the present embodiment are the concentration of the reactant in the first raw material and the second raw material, and the reaction path length L32. The concentration of the reactant in the first raw material and the second raw material and the reaction path length L32 are determined in advance in the present embodiment, and are not controlled through the system controller 15 (for example, a control for changing the concentration to a higher value or a control for changing the concentration to a lower value is not performed). As described above, in the flow reaction, the control by the system controller 15 is not performed, and condition parameters to be changed in, for example, the raw material preparation process and the assembly process of the flow reactor 11 may be included.

Figure 2:
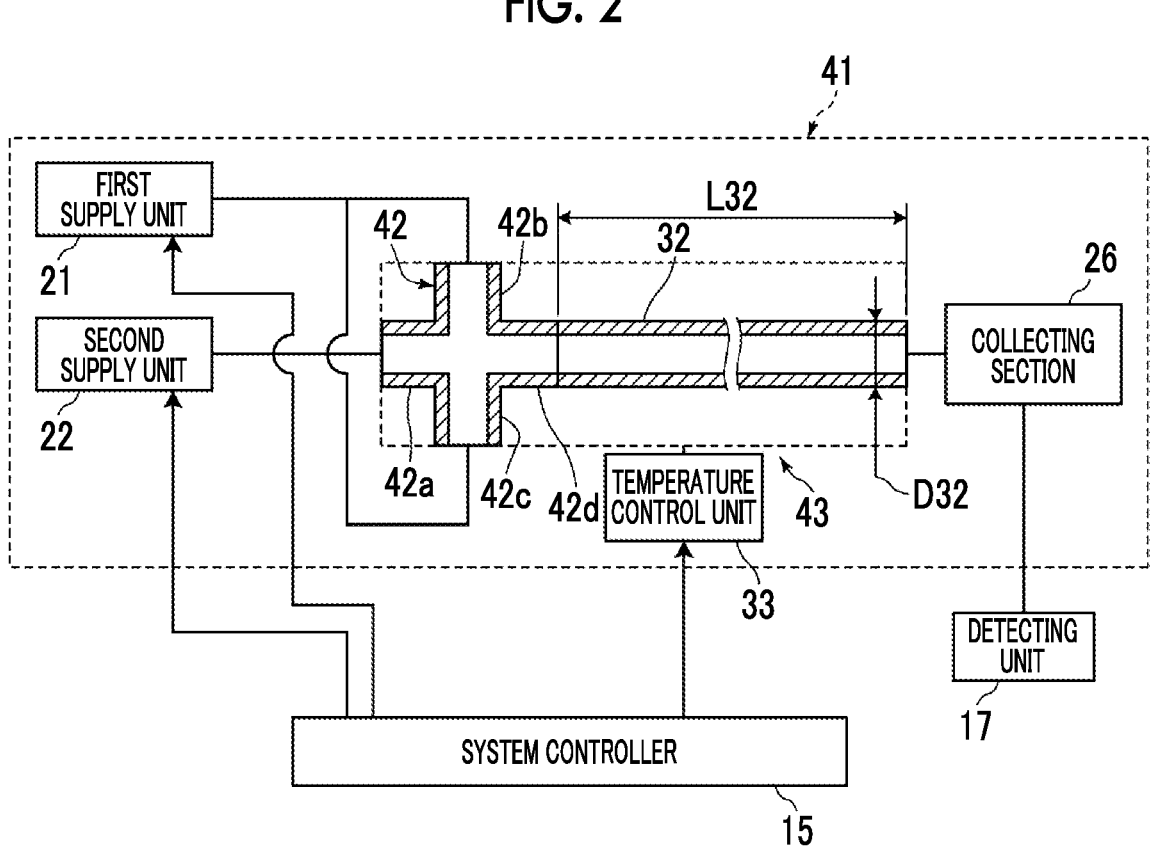
FIG. 2 is a schematic diagram showing another flow reactor.

In the flow reaction facility 10, the flow reactor 11 can be replaced with another flow reactor. For example, in the present embodiment, the flow reactor 41 shown in FIG. 2 can be replaced with the flow reactor 11 shown in FIG. 1. The flow reactor 41 comprises a reaction section 43 in which the merging portion 31 is replaced with a merging portion 42. Further, in FIG. 2, the same members as those in FIG. 1 are denoted by the same reference numerals as those in FIG. 1, and description thereof will not be repeated.

The merging portion 42 is a cross-branched tube, that is, a cross tube. A first tube part 42a of the merging portion 42 is connected to the second supply unit 22, a second tube part 42*b* and a third tube part 42*c* intersecting with the first tube part 42*a* are connected to the first supply unit 21, and the remaining fourth tube part 42*d* is connected to the reaction portion 32. Thus, the guided first raw material and second raw material merge with each other and are sent to the reaction portion 32 in a mixed state.

The support apparatus 12 performs a support for quickly determining a plurality of condition parameters that form a reaction condition in the flow reaction process to be performed by the flow reactor 11. Details of the support apparatus 12 will be described later.

The data generation device 13 generates a data set consisting of a plurality of pieces of learning data for training a neural network in which a plurality of layers are connected by a plurality of connection weights, the neural network outputting a reaction result corresponding to a reaction condition in a case where the reaction condition is input in the flow reaction process to be performed by the flow reactor 11.

Figure 3:
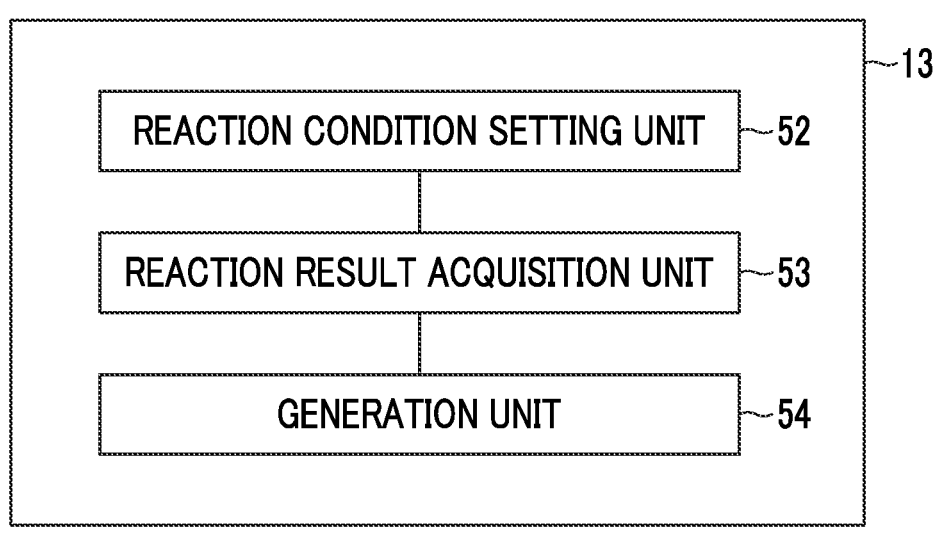
FIG. 3 is a schematic block diagram showing a configuration of a data generation device.

FIG. 3 is a schematic block diagram showing the configuration of the data generation device. As shown in FIG. 3, the data generation device 13 comprises a reaction condition setting unit 52, a reaction result acquisition unit 53, and a generation unit 54.

The reaction condition setting unit 52 and the reaction result acquisition unit 53 correspond to the process condition setting unit and the production result acquisition unit of the present disclosure, respectively.

Figure 4:
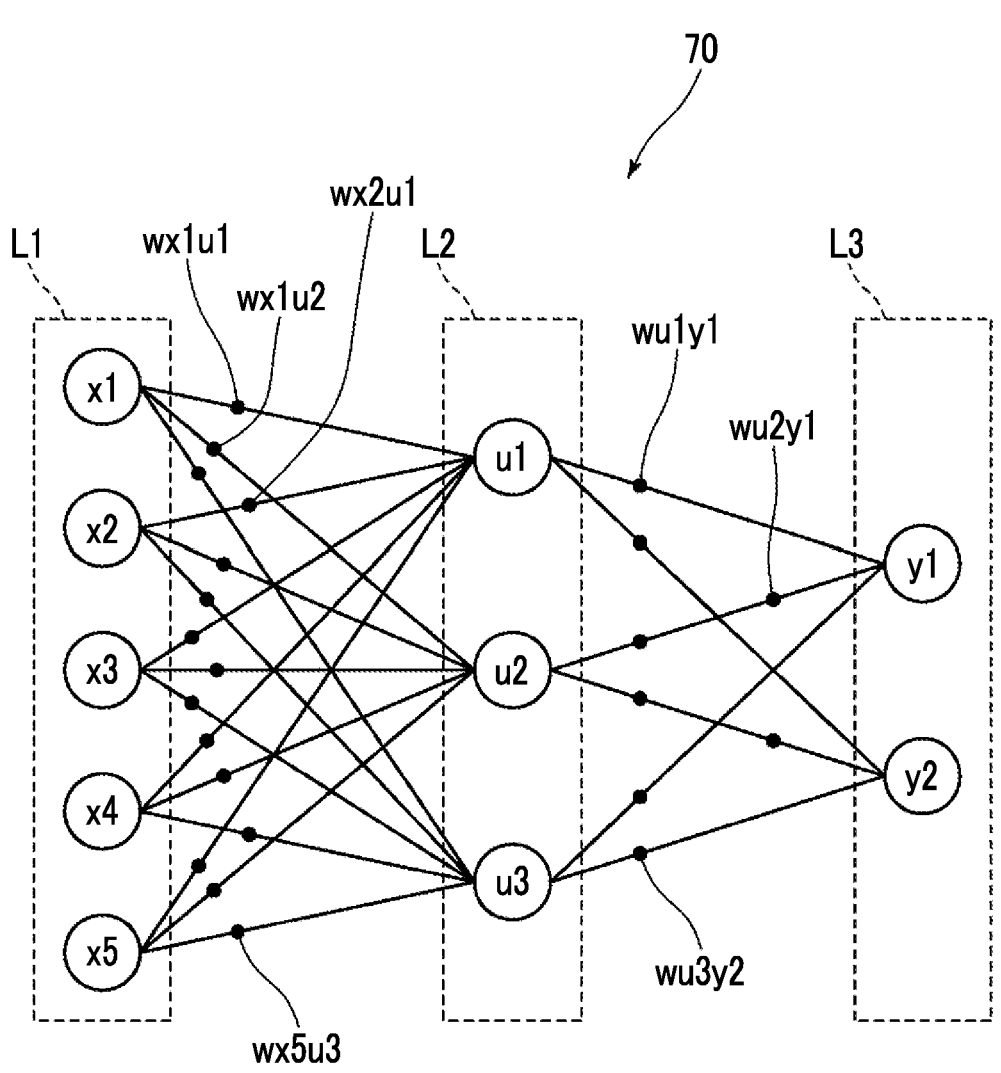
FIG. 4 is a conceptual diagram of a layer structure of a neural network.

The reaction condition setting unit 52 sets a plurality of reaction conditions of $2 \times M0$ or more, where M0 is the total number of connection weights of the neural network. The reaction condition setting unit 52 also sets the upper limit and the lower limit of each condition parameter included in the reaction condition. FIG. 4 is a conceptual diagram of a layer structure of a neural network used in the present embodiment. As shown in FIG. 4, a neural network 70 has a three-layer structure of an input layer L1, an interlayer (hidden layer) L2, and an output layer 13. The input layer L1 includes a value $x_i$ of a condition parameter which is an explanatory variable. In the present embodiment, the condition parameters are the flow rate of the first raw material, the flow rate of the second raw material, the shape of the merging portion, the reaction path diameter D32, the reaction path length L32, and the reaction temperature, so that i=1 to 5. The hidden layer L2 includes three nodes u1 to u3, and is one layer in the present embodiment. The output layer L3 includes a value $y_m$ of a result parameter which is an objective variable. In the present embodiment, the result parameters are the molecular weight and the dispersity, so that m=1 and 2. The detailed configuration of the neural network 70 will be described later.

In a case where the neural network 70 as shown in FIG. 4 is used, the total number M0 of the connection weights of the neural network is $5 \times 3 + 3 \times 2 = 21$. Therefore, the reaction condition setting unit 52 sets $2 \times 21 = 42$ or more of reaction conditions. Further, as the upper limit of the number of reaction conditions, $10 \times M0$ is used in the present embodiment. In the present embodiment, the reaction condition set by the reaction condition setting unit 52 based on the total number M0 of connection weights is used as the initial reaction condition, The upper limit of the flow rate of the first raw material and the flow rate of the second raw material as the condition parameters may be determined based on the capacity of the pump provided in the first supply unit 21 and the second supply unit. On the other hand, the lower limit of the flow rate may be the velocity at which the pipe is filled with the raw material. In a case where the flow velocity becomes excessively low, the pipe will not be filled with raw materials, air will be mixed into the pipe, and reaction unevenness will occur. Therefore, the velocity at which the pipe is filled with the raw material means the lowest velocity at which the raw material can be supplied so that air does not mix into the pipe. Here, in a case where the reaction path diameter is small as in the flow reactor, the area (specific surface area) per fluid volume is large, so that the reaction unevenness remarkably occurs in a case where the pipe is not filled with the raw material. As described above, the occurrence of reaction unevenness can be prevented by determining the lower limit of the flow rate of the first raw material and the flow rate of the second raw material at the velocity at which the pipe is filled with the raw material.

On the other hand, in a case of collecting continuous learning data, the quality of the collected learning data is important. That is, it is important to collect the learning data in which the upper limit and the lower limit of the condition parameters included in the learning data are evenly dispersed in the learning data. Depending on how the condition parameters are assigned in a case of collecting the learning data, the learning data may be biased, and as a result, only poor quality learning data may be obtained. Therefore, in the case of collecting learning data, especially in the flow reaction process, it is effective to assign the condition parameters by using the physical quantities strongly expressed on the microscale or milliscale of the flow reaction. That is, in mixing in a microscale or milliscale flow path, since the flow is a dense laminar flow, first, a tine and regular fluid parcel is generated by dividing and mixing the fluid, and as necessary, forced convection mixing such as collision is used, and finally the mixing is completed by molecular diffusion. Therefore, a random mixing state due to turbulent flow as seen in the macro size does not occur, and a uniform mixing operation can be performed throughout. The flow rate is highly dependent on the promotion of convection mixing.

Therefore, as a condition parameter included in the learning data, in order to make the flow rate vary, first, a value of 50% with respect to the upper limit and the lower limit of the flow rate is derived as an intermediate value. Then, the flow rate is adjusted to be within a first range which is equal to or more than the lower limit and less than the intermediate value of the flow rate. Next, the flow rate is adjusted to be within a second range of the intermediate value or more and the upper limit or less of the flow rate. It is preferable that the number of pieces of learning data is the same in the first range and the second range, but at least 30% of the learning data may be within the first range or the second range. This makes it possible to continuously collect unbiased learning data within the upper limit and the lower limit of the flow rate. By using such a method, it is possible to generate high-quality learning data with variations in condition parameters. Further, the flow rate may be adjusted to be within the second range first, and then the flow rate may be adjusted to be within the first range.

The reaction result acquisition unit 53 acquires the reaction result derived by causing the flow reactor 11 to perform the flow reaction process according to each of the plurality of reaction conditions set by the reaction condition setting unit 52. That is, the reaction result, that is, the result parameter is acquired for each of the set reaction conditions. At this time, a piece of reaction information is generated by associating the individual reaction conditions with the reaction result. This piece of reaction information becomes learning data.

The generation unit 54 generates 42 pieces of reaction information, that is, learning data, which consists of a combination of reaction conditions and reaction results, as a data set. The generated data set is input to the support apparatus 12.

FIG. 5 is a diagram showing a data set. As shown in FIG. 5, the data set consists of 42 pieces of learning data. In each learning data, reaction conditions including the flow rate of the first raw material, the flow rate of the second raw material, the shape of the merging portion, the reaction path diameter in the reaction portion, and the reaction temperature are associated with reaction results including the dispersity and the molecular weight of the product.

Figure 6:
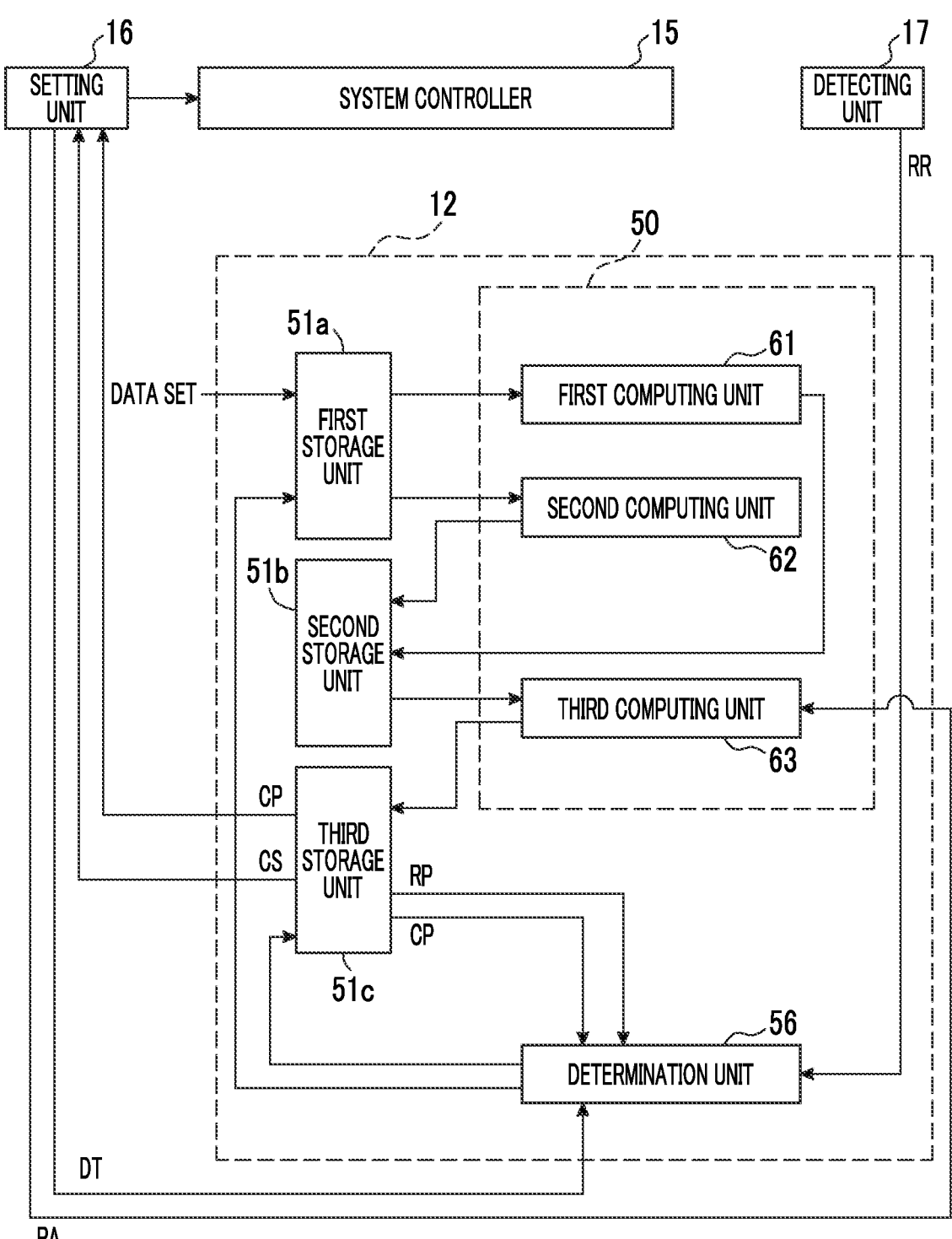
FIG. 6 is a block diagram showing a configuration of a flow reaction support apparatus.

FIG. 6 is a schematic block diagram showing the configuration of the support apparatus 12. As shown in FIG. 6, the support apparatus 12 includes a computing section 50, a first storage unit 51a to a third storage unit 51c, a determination unit 56, and the like. In the present embodiment, the first storage unit 51a to the third storage unit 51c are configured separately from the computing section 50, but may be configured as a part of the computing section 50. The computing section 50 and the determination unit 56 constitute the learning device of the present disclosure.

The first storage unit 51a stores a data set consisting of a plurality of pieces of learning data generated by the data generation device 13. Further, in a case where the reaction result is acquired in the flow reactor 11 due to the reaction conditions that are not in the data set, the reaction information consisting of the reaction conditions and the reaction result is stored as new learning data. The first storage unit 51a stores the reaction information in a state of being readable only under the reaction condition. For example, the first storage unit 51a stores the reaction condition and the reaction result included in the learning data in different fields, and stores association information of the reaction condition and the reaction result. Alternatively, a field for storing both the reaction condition and the known reaction result and a field for storing only the reaction condition may be provided.

At the time of initial learning, the reaction information included in the data set generated by the data generation device 13 is used for learning as learning data. In the present embodiment, in the initial state, a data set consisting of 42 pieces of learning data shown in FIG. 5 is stored in the first storage unit 51a.

As shown in FIG. 5, the data set stored in the first storage unit 51a stores a plurality of pieces of learning data in a table structure in the present embodiment. Specifically, the types of learning data are arranged in a vertical column, and the types of learning data, reaction conditions, and reaction results are arranged in a horizontal column. Here, the vertical column and the horizontal column may be reversed. A storage form of the data set in the first storage unit 51a is not limited to the table structure, and any form may be used as long as the reaction condition and the reaction result are associated with each other. Accordingly, for example, any form in which respective fields for the reaction conditions and the reaction results are provided and stored may be used.

The computing section 50 has a learning mode and a calculation mode, and performs a target computing process according to the mode. The computing section 50 comprises a first computing unit 61 to a third computing unit 63, in which the first computing unit 61 performs a computing process in the learning mode, and repeats a state in which the computation is paused and a state in which the first storage unit 51a is read, as described later, in the calculation mode. The second computing unit 62 and the third computing unit

63 are in a pause state in the learning mode, and perform a computing process in the calculation mode.

The first computing unit 61 reads out the data set stored in the first storage unit 51a, and uses learning data included in the read-out data set to learn a relationship between the reaction condition and the reaction result. Then, the first computing unit 61 generates a function in which the reaction condition and the reaction result are associated with each other by learning, and writes the generated function in the second storage unit 51b. A plurality of condition parameters forming the reaction condition and result parameters forming the reaction result are respectively variables in the function, and in a case where the condition parameters and the result parameters are already determined, the generation of the function means generation of coefficients in the function.

In the present embodiment, the first computing unit 61 performs learning using each condition parameter of the reaction condition as an explanatory variable, and the result parameters of the reaction result as objective variables, to thereby derive a weighting coefficient representing the connection weight of the neural network, and construct a trained neural network after the first learning is finished. The explanatory variables correspond to input variables, and the objective variables correspond to output variables. In the present embodiment, for example, the following functions (1A) and (1B) are generated by the neural network constructed in the first computing unit 61.

$$y1 = w_{u1y1}/[1 + \exp\{-(w_{x1u1} \times x1 + w_{x2u1} \times x2 + ... + w_{x5u1} \times x5)\}] + \quad (1A)$$
$$w_{u2y1}/[1 + \exp\{-(w_{x1u2} \times x1 + w_{x2u2} \times x2 + ... + w_{x5u2} \times x5)\}] +$$
$$w_{u3y1}/[1 + \exp\{-(w_{x1u3} \times x1 + w_{x2u3} \times x2 + ... + w_{x5u3} \times x5)\}]$$

$$y2 = w_{u1y2}/[1 + \exp\{-(w_{x1u1} \times x1 + w_{x2u1} \times x2 + ... + w_{x5u1} \times x5)\}] + \quad (1B)$$
$$w_{u2y2}/[1 + \exp\{-(w_{x1u2} \times x1 + w_{x2u2} \times x2 + ... + w_{x5u2} \times x5)\}] +$$
$$w_{u3y2}/[1 + \exp\{-(w_{x1u3} \times x1 + w_{x2u3} \times x2 + ... + w_{x5u3} \times x5)\}]$$

In the above functions (1A) and (1B), xi (i is a natural number) is a value of a condition parameter, and a maximum value of i is the number of condition parameters. In the present embodiment, since the neural network having the structure shown in FIG. 4 is used, i is 5 in the present embodiment. ym (m is a natural number) is a value of a result parameter, and a maximum value of m is the number of result parameters. Therefore, in is 2 in the present embodiment. ul (l is a natural number) is a node of the hidden layer L2, and a maximum value of l is the number of nodes. In the present embodiment, l is 3. $w_{xiul}$ and $w_{ulym}$ are weighting coefficients representing the connection weight of the neural network, Details are as follows. 1 mL (milliliter)/min can be converted as $1 \times 10^{-6} \times (1/60)$ m$^3$/sec, with respect to the flow rates below.

y1: molecular weight of polystyrene y2: dispersity of polystyrene x1 (having a unit of mL/min): flow rate of the first raw material (minimum value 0.5 mL/min, maximum value 100 mL/min)

x5 (having a unit of mL/min): flow rate of the second raw material (minimum value 0.5 mL/min, maximum value 100 mL/min)

x3 (dimensionless value): it is defined as "1" in a case where the merging portion is T-shaped, and it is defined as "2" in a case where the merging portion is cross-shape x4 (having a unit of mm): reaction path diameter (minimum value 1 mm, maximum value 10 mm)

x5 (having a unit of ° C.); reaction temperature (minimum value 0° C., maximum value 10° C.)

ul; node $w_{xiul}$: weighting coefficient between xi and ul ym: value of result parameter $w_{ulym}$: weighting coefficient between ul and ym The neural network can be constructed using a commercially available neural network fitting application. For example, in the present embodiment, the neural network is constructed by using Matlab Neural Fitting tool manufactured by MathWorks, Inc. The neural network fitting application is not limited to the above description, and for example, keras package manufactured by RStudio, PBC, which can operate in the R language, or the like, may be used.

As shown in FIG. 4 described above, the neural network has a three-layer structure of an input layer L1, a hidden layer L2, and an output layer L3. The input layer L1 includes values x1 to x5 of condition parameters which are explanatory variables. The hidden layer L2 includes three nodes u1 to u3, and is one layer in the present embodiment. Each of the nodes u1 to u3 is the sum of the values obtained by weighting x1 to x5 with a weighting coefficient $w_{xiul}$ corresponding to each of x1 to x5. The output layer L3 includes values y1 and y2 of result parameters which are objective variables. Each of the values y1 and y2 of the result parameters is a value obtained by weighting nodes u1 to u3 with a weighting coefficient $w_{ulym}$ corresponding to each of the nodes u1 to u3. The black circles "•" in FIG. 4 indicate the weighting coefficients $w_{xiul}$ and $w_{ulym}$. The layer structure of the neural network is not limited to the present embodiment.

The computing section 50 switches the learning mode to the calculation mode in a case where a function is written in the second storage unit 51b by the first computing unit 61. In the calculation mode, the second computing unit 62 reads out a reaction condition of learning data from the first storage unit 51a, generates a condition data set including a plurality of reaction conditions whose reaction results are unknown based on the read-out reaction condition, and writes the generated condition data set in the second storage unit 51b. The condition data set may include the read-out reaction conditions whose reaction results are known, which is the case in the present embodiment.

The second computing unit 62 generates the condition data set by taking a value of at least one condition parameter among a plurality of condition parameters that form the reaction condition and generating a reaction condition whose reaction result is unknown. For example, with respect to the flow rate of the first raw material among the plurality of condition parameters, in a case where the flow rate of the first raw material within the reaction condition in the learning data generated by the data generation device 13 includes 1 mL/min, 10 mL/min, 11 mL/min, 20 mL/min, and 100 mL/min, since the reaction result in a case where the flow rate thereof is 2 mL/min, 5 mL/min, 6 mL/min, or the like, for example is unknown, the reaction conditions having these values are generated.

The value of the condition parameter generated in a state of the reaction condition having an unknown reaction result is a value between a minimum value and a maximum value in the condition parameters of the reaction condition read-out from the first storage unit 51a, or may include the minimum value and the maximum value in addition thereto. For example, in the above example, since the minimum value of the flow rate of the first raw material is 1 mL/min and the maximum value thereof is 100 mL/in, a plurality of condition parameter values are generated between these two values. In the present embodiment, in addition to these, a minimum value of 1 mL/min and a maximum value of 100 mL/min may be included. Furthermore, it is preferable that the plurality of values between the maximum value and the minimum value are values obtained by dividing a difference value between the maximum value and the minimum value at an equal interval, and in the present embodiment, the flow rate of the first raw material has values of an interval of 1 mL/min as described later (see FIG. 7).

A condition parameter of which a value is to be taken, among the plurality of condition parameters that form the reaction condition, is set to a condition parameter that can be determined to be changeable in the flow reactor 11. In the present embodiment, a plurality of reaction conditions having values respectively taken with respect to the flow rate of the first raw material, the flow rate of the second raw material, the type of the merging portion (the merging portion 31 and the merging portion 42), the reaction path diameter D32, and the reaction temperature are generated (see FIG. 7).

The second storage unit 51b stores the function output from the first computing unit 61 and the condition data set output from the second computing unit 62 shown in FIG. 7. In addition, in the present embodiment, the second computing unit 62 generates the condition data set, but the condition data set may be generated using another computer such as a personal computer. Further, as shown in FIG. 7. the condition data set generated by the second computing unit 62 also has a table structure in the present embodiment, and accordingly, a condition data set having the table structure is stored in the second storage unit 51b. Specifically, different reaction conditions are arranged in a vertical column, and condition parameters are arranged in a horizontal column. Here, the vertical column and the horizontal column may be reversed. Further, the condition data set is not limited to the table structure like the learning data, and any form in which the condition data set is generated to be individually readable for each reaction condition and stored in the second storage unit 51b may be used.

As shown in FIG. 7, in the condition data set, as described above, the maximum value and the minimum value, and the values obtained by dividing the difference value between the maximum value and the minimum value at an equal interval are set. For example, the flow rate of the first raw material corresponds to values obtained by dividing a difference value between the minimum value of 1 mL/min and the maximum value of 100 mL/min at an interval of 1 mL/min, and the flow rate of the second raw material corresponds to values obtained by dividing a difference between the minimum value of 0.6 mL/min and the maximum value of 55.0 mL/min at an interval of 0.1 mL/min. The merging portion has two shapes, that is, the merging portion 31 and the merging portion 42. The reaction path diameter 132 corresponds to values obtained by dividing a difference value between the minimum value of 1 mm and the maximum value of 10 mm at an interval of 1 mm, and the reaction temperature corresponds to values obtained by dividing a difference between the minimum value (lowest value) of 1° C. and the maximum value (highest value) of 10° C. at an interval of 1° C., Here, the interval in a case where the values are obtained by the division at an equal interval is not limited thereto.

The third computing unit 63 reads out the function and the condition data set from the second storage unit 51b, generates a prediction data set, and writes the generated prediction data set in the third storage unit 51c. The prediction data set includes a plurality of pieces of prediction information. The prediction information is prediction data in which a prediction result obtained by predicting a reaction result for each reaction condition of the condition data set is associated with the reaction condition. Accordingly, the number of pieces of prediction information is equal to the number of the reaction conditions in the condition data set. The prediction is a computing process performed using the read-out function.

The third computing unit 63 specifies and extracts prediction information indicating the best prediction result from the plurality of pieces of prediction information. Then, the third computing unit 63 writes the reaction condition of the extracted prediction information as an extracted reaction condition CP in the third storage unit 51c, and writes the prediction result RP of the extracted prediction information in association with the extracted reaction condition CP in the third storage unit 51c.

A target reaction result (hereinafter, referred to as a target result) RA is input to the third computing unit 63 in advance by an operating signal by, for example, an input in the operating unit of the setting unit 16 in the present embodiment. The third computing unit 63 compares the target result RA with the prediction result of each piece of prediction information of the prediction data set, and specifies a prediction result that is closest to the target result RA among the plurality of prediction results (having the smallest difference from the target result RA) as the "best prediction result", in a case where there is the same prediction result as the target result RA, the prediction result is specified as the "best prediction result".

Further, in a case where there are a plurality of prediction results that are closest to the target result RA, learning data is read out from the first storage unit 51a, and the "best prediction result" is specified according to the following process with reference to the reaction condition of the learning data whose reaction result is the closest to the target result RA. First, in a case where the condition parameters of each piece of prediction information of the prediction data set are x1 to x5, the result parameter is y1, and contributions to y1 are a1 to a5, a1 to a5 are defined by the following equations (1C) to (1G).

$$a1 = w_{x1u1} \times w_{u1y1} + w_{x1u2} \times w_{u2y1} + w_{x1u3} \times w_{u3y1} + \dots + w_{x1u1} \times w_{u1y1} \quad (1C)$$

$$a2 = w_{x2u1} \times w_{u1y1} + w_{x2u2} \times w_{u2y1} + w_{x2u3} \times w_{u3y1} + \dots + w_{x2u1} \times w_{u1y1} \quad (1D)$$

$$a3 = w_{x3u1} \times w_{u1y1} + w_{x3u2} \times w_{u2y1} + w_{x3u3} \times w_{u3y1} + \dots + w_{x3u1} \times w_{u1y1} \quad (1E)$$

$$a4 = w_{x4u1} \times w_{u1y1} + w_{x4u2} \times w_{u2y1} + w_{x4u3} \times w_{u3y1} + \dots + w_{x4u1} \times w_{u1y1} \quad (1F)$$

$$a5 = w_{x5u1} \times w_{u1y1} + w_{x5u2} \times w_{u2y1} + w_{x5u3} \times w_{u3y1} + \dots + w_{x5u1} \times w_{u1y1} \quad (1G)$$

Here, in a case where a sign of each of a1 to a5 is obtained to be positive, a positive contribution is given to the prediction result, and in a case where the sign is negative, a negative contribution is given to the prediction result, in which the larger the absolute value, the higher the contribution to the prediction result.

Subsequently, the reaction result closest to the target result RA and the reaction condition are selected from the learning data, and in a case where the reaction result is denoted as y1$n$, an absolute value of a difference between y1$n$ and the target result RA is calculated by a calculation formula of $|RA - y1n|/RA$, Then, attention is paid to the magnitudes of absolute values of a1 to a5. For example, in a case where the absolute value of at is the largest among the absolute values of a1 to a5, the "best prediction result" is specified by the following four cases of <A> to <D>.

<A> Case where the difference between y1$n$ and RA and y1RA−y1$n$/y1RA are both positive, and a1 is positive In a case where y1$n$ is increased in the positive direction, y/ln approaches RA. Accordingly, a prediction result having condition parameters having the largest value in the positive direction compared with the value a1 of the condition parameter of the reaction condition closest to the target result RA in the learning data is specified as the "best prediction result".

<B> Case where the difference between y1$n$ and RA and y1RA−y1$n$/y1RA are both positive, and a1 is negative In a case where y1$n$ is increased in the positive direction, y1$n$ approaches RA. Accordingly, a prediction result having condition parameters having the largest value in the negative direction compared with the value a1 of the condition parameter of the reaction condition closest to the target result RA in the learning data is specified as the "best prediction result".

<C> Case where the difference between y1$n$ and RA and y1RA−y1RA are both negative, and a1 is positive In a case where y1$n$ is increased in the negative direction, y1$n$ approaches RA. Accordingly, a prediction result having condition parameters having the largest value in the negative direction compared with the value a1 of the condition parameter of the reaction condition closest to the target result RA in the learning data is specified as the "best prediction result".

<D> Case where the difference between y1$n$ and RA and y1RA−y1RA are both negative, and a1 is negative In a case where y1$n$ is increased in the negative direction, y1$n$ approaches RA, Accordingly, a prediction result having condition parameters having the largest value in the positive direction compared with the value a1 of the condition parameter of the reaction condition closest to the target result RA in the learning data is specified as the "best prediction result".

In a case where there are a plurality of result parameters of the reaction result, the target result RA is input in a state where the plurality of result parameters are weighted, and the third computing unit 63 specifies the "best prediction result" based on the weights. The specification based on the weights may be, for example, a first method of performing the specification using only the result parameter having the largest weight, or may be a second method of narrowing down, for example, a plurality of candidates from the prediction results closest to the target result RA with the result parameter having the largest weight and specifying the prediction result closest to the target result RA in the result parameters having low weighting ranks among the narrowed-down prediction results as the "best prediction result", In the present embodiment, the specification is performed by the second method. The target result RA in the present embodiment has a molecular weight of ±1% or less of 25,200 and a dispersity of 1.03 or less.

The third storage unit 51c stores the prediction data set output from the third computing unit 63, the extracted reaction condition CP, and the prediction result RP associated with the extracted reaction condition CP. The prediction data set, the extracted reaction condition CR and the prediction result RP are stored in an individually readable state.

FIG. 8 is a diagram showing a prediction data set generated by the third computing unit 63. As shown in FIG. 8, the prediction data se generated by the third computing unit 63 also has a table structure in the present embodiment, and accordingly, the prediction data set having the table structure is stored in the third storage unit 51c. Specifically, the types of prediction information are arranged in a vertical column, and condition parameters of reaction conditions and result parameters that are prediction results are arranged in a horizontal column. Here, the vertical column and the horizontal column may be reversed. The prediction data set is not limited to the table structure like the learning data, and any form in which the reaction conditions and the prediction results are associated with each other and at least the extracted reaction condition CP is generated in a readable form and is stored in the third storage unit 51c may be used.

FIG. 8 shows a prediction data set generated based on the condition data set of FIG. 7.

In the present embodiment, two result parameters are weighted as described above, and the weight of the molecular weight is made larger than that of the dispersity. In the present embodiment, as shown in FIG. 8, for the molecular weight having the larger weight, the molecular weights of a prediction information number (hereinafter, referred to as a prediction information No.) 6050 and prediction information No. 8000 are 24,870, and are closest to the target result RA compared with other prediction information Nos., in which their values are the same. Then, among the prediction information No. 6050 and the prediction information No, 8000, the prediction information No. 6050 is closer to the target result RA for a dispersity where the weighting is lower than the molecular weight. Accordingly, the third computing unit 63 specifies that the prediction result of the prediction information No. 6050 as the above-mentioned "best prediction result", and specifies the reaction condition of the prediction information No. 6050 as the extracted reaction condition CP. Then, the third computing unit 63 causes the third storage unit 51c to store the extracted reaction condition CP and the prediction result associated with the extracted reaction condition CP in a state where a record indicating the extracted reaction condition CP is given to the reaction condition of the prediction information No. 6050 (in Table 6, for ease of description, "*" is attached next to the prediction information No.).

The setting unit 16 reads out the extracted reaction condition CP from the third storage unit 51c. The extracted reaction condition CP input from the third computing unit 63 of the computing section 50 through the third storage unit 51c in this way is set as an input signal, and the extracted reaction condition CP is set as a reaction condition in the flow reactor 11. The detecting unit 17 outputs a reaction result (hereinafter, referred to as a measurement result) RR of the flow reaction process performed under the extracted reaction condition CP to the determination unit 56, as described above.

The determination unit 56 reads out the prediction result RP associated with the extracted reaction condition CP from the third storage unit 51c, compares the prediction result RP with the measurement result RR input from the detecting unit 17, and calculates a degree of difference DR between the prediction result RP and the measurement result RR. In the present embodiment, the degree of difference DR is calculated by a calculation formula |RP−RR|/RR, but as long as a value that can be used as an index of the certainty of the prediction result RP is calculated, the method of calculating the degree of difference DR is not particularly limited.

The determination unit 56 generates comparison data in a case where a comparison computation of the prediction result RP and the measurement result RR is performed. Further, the determination unit 56 has a comparison data storage unit (not shown) that stores the comparison data. FIG. 9 shows comparison data in a case where the comparison computation is performed. The comparison data is generated in a table structure in which the result parameters of the prediction result RP and the result parameters of the measurement result RR are arranged. In the present embodiment, the prediction result RP and the measurement result RR are disposed in a vertical column and the two result parameters of the dispersity and the molecular weight are disposed in a horizontal column, but the vertical column and the horizontal column may be reversed. Further, as long as the same result parameters of the prediction result RP and the measurement result RR are stored in the comparison data storage unit in a readable state, the storage form is not limited to the table structure.

The determination unit 56 calculates a degree of difference DR of the molecular weight and a degree of difference DR of the dispersity, respectively, using the comparison data, by the above-described calculation formulas. For example, in a case where the comparison data shown in FIG. 9 is used, the degree of difference DR of the molecular weight is calculated as 9.9891 and the degree of difference DR of the dispersity is calculated as 3.5107.

An allowable range DT of the degree of difference is input to the determination unit 56 in advance as an operating signal by, for example, an input in the operating unit of the setting unit 16 in the present embodiment. The determination unit 56 determines whether the degree of difference DR is within the allowable range DT. The allowable range DT is set to 1% in the present embodiment, but the allowable range may be appropriately set according to the type of the result parameter and the like. The allowable range DT (having a unit of %) cab be calculated by the calculation formula of $(|RP-RR|/RR) \times 100$.

In a case where it is determined that the degree of difference DR is within the allowable range DT, the determination unit 56 sets the extracted reaction condition CP in the reaction condition group of the prediction data set stored in the third storage unit 51c as a reaction condition (hereinafter, referred to as a determined reaction condition) CS of the flow reaction process to be performed by the flow reactor 11, and writes the result in the third storage unit 51. The reaction condition group of the prediction data set stored in the third storage unit 51c, including the setting of the extracted reaction condition CP as the determined reaction condition CS, may be written in the third storage unit 51c as a reaction data set to be used in the flow reaction process of the flow reactor 11, which is the case in the present embodiment.

In the present embodiment, the determination unit 56 stores the reaction data set in the third storage unit 51c in a readable state for each reaction condition. In the present embodiment, the third storage unit 51c has an area where the prediction data set is stored and an area where the reaction information data set is stored, but as long as the reaction data set is stored in a readable state for each reaction condition, the determination unit 56 may rewrite the reaction condition group of the prediction data set to the reaction data set. In that case, the third computing unit 63 causes the third storage unit 51c to store the prediction data set in advance in a readable state for each reaction condition. Further, in the present embodiment, the reaction condition data set is stored in the third storage unit 51c, but a fourth storage unit (not shown) may be further provided, and the reaction condition data set may be stored in the fourth storage unit.

In a case where it is determined that the degree of difference DR is not within the allowable range DT, the determination unit 56 reads out the extracted reaction condition CP from the third storage unit 51c, and generates reaction information in which the extracted reaction condition CP and the measurement result RR are associated with each other. Then, the generated reaction information is written in the first storage unit 51a as new learning data. By this writing, the data set stored in the first storage unit 51a is rewritten, and the number of pieces of learning data included in the data set changes. In the present embodiment, the initial data set stored in the first storage unit 51a includes 42 pieces of learning data, and one piece of reaction information is added as learning data by one writing by the determination unit 56, so that the number of pieces of learning data included in the data set is updated to 43.

Further, the determination unit 56 updates the number of connection weights of the neural network 70 in a case where the number of data sets is updated. Here, assuming that the number of updated data sets is Nj and the number of connection weights of the neural network 70 before and after the update is Mj−1 and Mj, respectively, the determination unit 56 updates the number Mj of the new connection weights of the neural network so that Mj−1≤Mj<Nj/2. For example, in a case where the number of data sets is updated to 43, the number Mj−1 of the connection weights of the neural network before the update is 21, so that the number Mj of the updated connection weights is maintained at 21.

The number of connection weights of the neural network 70 can be increased by increasing the number of hidden layers or the number of nodes ul in the hidden layer L2. Here, in a case where the number of nodes in the hidden layer L2 is increased by one to become four, the total number of connection weights is 5×4+4×2=28. The minimum value of the number Nj of the number of data sets for satisfying the above-mentioned relationship of <Mj−1≤Mj<Nj/2 so that Mj=28 is 57. Therefore, the number of connection weights of the neural network 70 is maintained at 21 until the number of data sets is 57, and in a case where the number of data sets is 57, the number of connection weights is updated to 28 by adding one node in the hidden layer L2.

In the present embodiment, the first computing unit 61 repeats the pause state and the reading of the first storage unit 51a in the calculation mode, as described above. Specifically, the first computing unit 61 reads the learning data of the first storage unit 51a at a preset time interval, and determines whether or not the previously read data set is rewritten to a data set including new learning data.

In a case where the first computing unit 61 determines that the data set stored in the first storage unit 51a is not be rewritten the computing section 50 continues the calculation mode. In a case where it is determined that the data is rewritten, the computing section 50 switches the calculation mode to the learning mode, and the first computing unit 61 performs the next learning using the new learning data included in the rewritten data set, generates a new function, and rewrites a function stored in the second storage unit 51b to the new function. The generation of the new function and the rewriting to the new function mean derivation of a new weighting coefficient in the function and rewriting of the weighting coefficient in the function. For example, in the above-mentioned functions (1A) and (1B), the weighting coefficient $w_{xiul}$ is rewritten to $w_{xiul'}$. Thus, the following functions (2A) and (2B) are generated.

$$y1 = \tag{1A}$$
$$w2_{u1y1}/[1 + \exp\{-(w2_{x1u1} \times x1 + w2_{x2u1} \times x2 + \ldots + w2_{x5u1} \times x5)\}] +$$
$$w2_{u2y1}/[1 + \exp\{-(w2_{x1u2} \times x1 + w2_{x2u2} \times x2 + \ldots + w2_{x5u2} \times x5)\}] +$$
$$w2_{u3y1}/[1 + \exp\{-(w2_{x1u3} \times x1 + w2_{x2u3} \times x2 + \ldots + w2_{x5u3} \times x5)\}]$$

$$y2 = \tag{1B}$$
$$w2_{u1y2}/[1 + \exp\{-(w2_{x1u1} \times x1 + w2_{x2u1} \times x2 + \ldots + w2_{x5u1} \times x5)\}] +$$
$$w2_{u2y2}/[1 + \exp\{-(w2_{x1u2} \times x1 + w2_{x2u2} \times x2 + \ldots + w2_{x5u2} \times x5)\}] +$$
$$w2_{u3y2}/[1 + \exp\{-(w2_{x1u3} \times x1 + w2_{x2u3} \times x2 + \ldots + w2_{x5u3} \times x5)\}]$$

Further, in a case where new learning data is generated, similarly, the second computing unit 62 newly generates a condition data set, Hereinafter, the significance of setting the number of reaction conditions to 2×M0 or more in a case where the total number of connection weights of the neural network 70 is M0 will be described. It is said that the larger the number of pieces of learning data, the better for training a neural network, but this is not always the case, and there is no clear definition. However, a sufficient number of pieces of learning data is required for the neural network to be trained so that the characteristics of the target phenomenon can be expressed.

In a neural network used for image recognition, computer Go, and the like, the structure of the neural network is complicated in order to increase the correct answer rate, and learning is performed using a large amount of learning data. For example, in a certain neural network for face recognition, the total number of connection weights is 120 million, and learning is performed using 4 million pieces of learning data. Further, in a certain neural network for computer Go, the total number of connection weights is 3 million, and learning is performed using the data of the Go board surface of 30 million phases as learning data.

On the other hand, in the production process covered by the present disclosure, it is difficult to generate such a large amount of learning data, and the structure of the neural network does not need to be as complicated as that of the neural network used in image recognition and computer Go.

The inventor of the present disclosure has come up with the present disclosure by paying attention to the sampling theorem of waveform data. Here, the sampling theorem is the minimum frequency required in a case of converting an analog signal into a digital signal. In a case of converting a continuous analog signal into a digital signal, the shape (frequency) of the original analog signal can be completely reproduced by sampling at a frequency twice or more included in the analog signal to generate the digital signal. On the other hand, in a case where the sampling frequency is less than twice the frequency included in the analog signal, a false signal appears in the original analog signal and is distorted and reproduced. This phenomenon is called the alias effect. In this way, in a case where sampling is performed at a frequency twice or more included in the analog signal, the analog signal can be accurately converted into a digital signal.

On the other hand, in the neural network, the function representing the relationship between the input layer (explanatory variable) and the output layer (objective variable) expressed by using the connection weight can be expressed as the above equations (1A) and (1B). This function is similar to a waveform function such as a sine waveform.

Therefore, the inventor of the present disclosure has come up with the present disclosure of preparing learning data that is at least twice the total number M0 of connection weights in order to express the characteristics of the target data by the neural network by using the sampling theorem.

On the other hand, in the flow reaction process, assuming that the time required for one reaction is one hour, learning data can be prepared by actual measurement in a case where it is about 10 times the number of connection weights. For example, in a case where the number of connection weights is 21, the time required to prepare 210 pieces of learning data is 210 hours (about 10 days), which is a sufficiently acceptable time. Therefore, in the present embodiment, the upper limit of the number of pieces of learning data is set to 10 times the total number M0 of connection weights.

Figure 10:
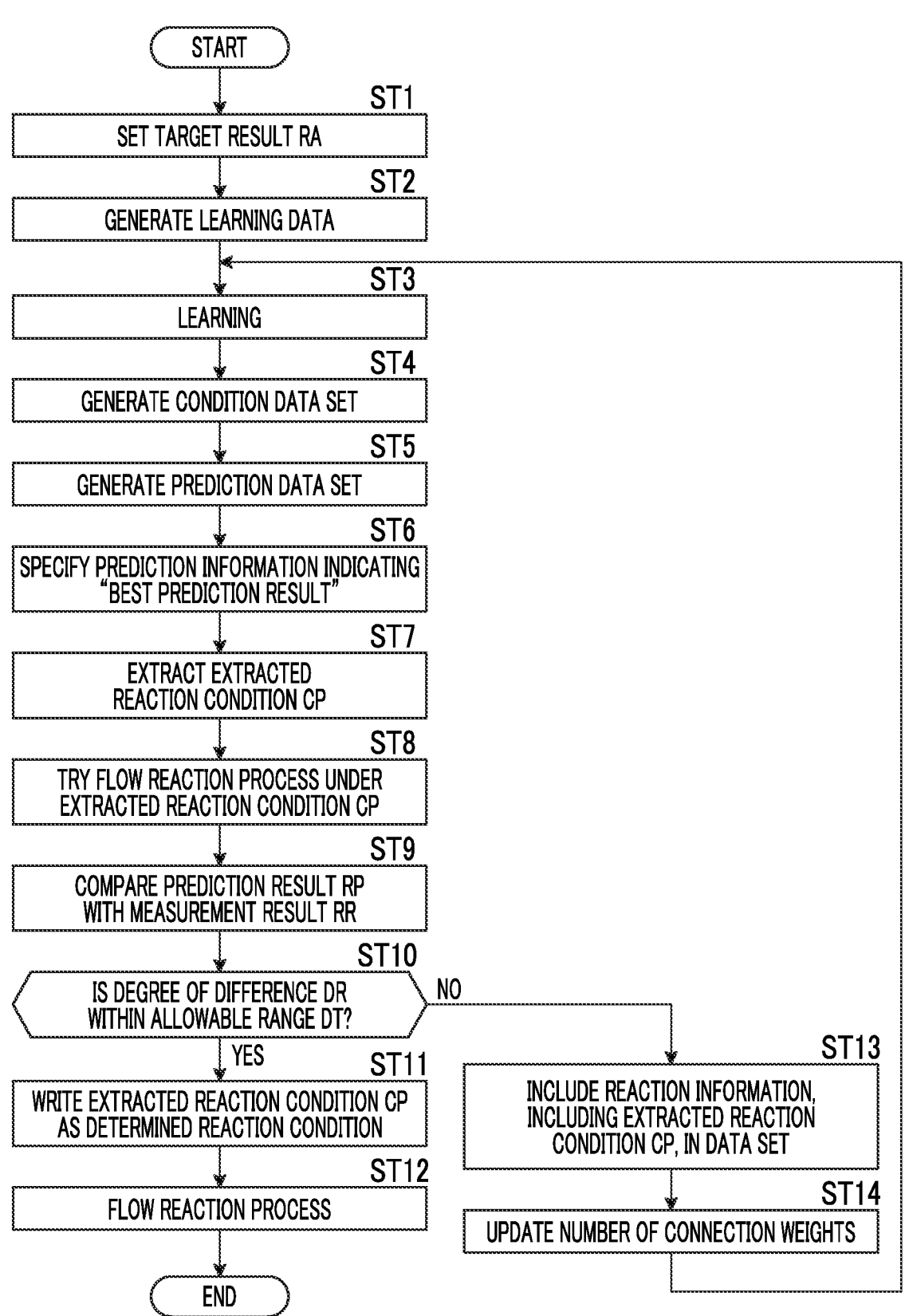
FIG. 10 is a flowchart showing a process performed in the present embodiment.

Next, a process performed in the present embodiment will be described. FIG. 10 is a flowchart showing a process performed in the present embodiment. First, in the present embodiment, the target result RA is set (Step ST1). As described above, the target result RA of the present embodiment has a dispersity within 1.03 and a molecular weight within ±1% of 25,200. Next, a data set including a plurality of pieces of learning data is generated (Step ST2). The order of the setting of the target result RA and the generation of the learning data may be reversed.

Figure 11:
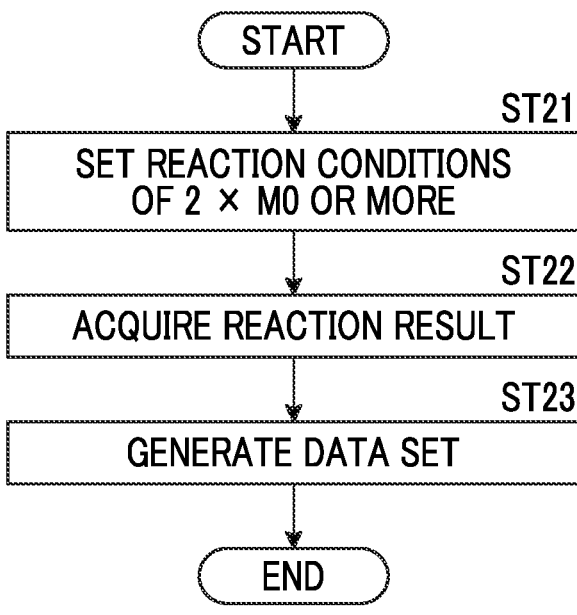
FIG. 11 is a flowchart showing a data generation process performed in the present embodiment.

FIG. 11 is a flowchart showing a learning data generation process performed in the present embodiment. First, the reaction condition setting unit 52 of the data generation device 13 sets a plurality of reaction conditions of 2×M0 or more, where M0 is the total number of connection weights of the neural network 70 (Step ST21). Then, the reaction result acquisition unit 53 acquires the reaction result derived by causing the flow reactor 11 to perform the flow reaction process according to each of the plurality of reaction conditions set by the reaction condition setting unit 52 (Step ST22). The generation unit 54 generates 42 pieces of reaction information, that is, learning data, which consists of a combination of reaction conditions and reaction results, as a data set (Step ST23), and ends the learning data generation process. The data set is stored in the first storage unit 51a.

The support apparatus 12 sets the mode to the learning mode, and thus, the first computing unit 61 reads out the data set of the first learning data from the first storage unit 51a. The data set may be output from the data generation device 13 to the first computing unit 61 without provision (without interposition) of the first storage unit 51a. In this way, the first computing unit 61 to which the first data set is input performs a computation of learning a relationship between the reaction condition and the reaction result based on the data set of the first learning data. Then, the first computing unit 61 generates a function of the condition parameter and the result parameter, and writes the generated function in the second storage unit 51b (learning: Step ST3).

After the function is written in the second storage unit 51b, the support apparatus 12 switches the learning mode to the calculation mode, and thus, the second computing unit 62 reads out the data set of the learning data from the first storage unit 51a. The second computing unit 62 takes a value of a condition parameter based on the reaction condition of the learning data included in the data set, specifically, based on the value of each condition parameter, and generates a condition data set including a plurality of different reaction conditions (Step ST4). The generated condition data set is written in the second storage unit 51b in a readable state for each reaction condition.

In the present embodiment, as described above, the condition data set is generated with the condition parameters dividedly including the maximum value, the minimum value, and the values obtained by dividing the difference value between the maximum value and the minimum value at an equal interval. Since the flow rate of the first raw material has 100 types, the flow rate of the second raw material has 545 types, the shape of the merging portion has 2 types, the reaction path diameter D32 has 10 types, and the reaction temperature has 11 types, the number of reaction conditions of the condition data set is 100×545×2×10×11, which is 11,990,000 in total.

In a case where the support apparatus 12 can perform learning (that is, Step ST3) process and calculation in parallel, the learning in the first computing unit 61 and the generation (that is, Step ST4) process of the condition data set in the second computing unit 62 may be performed at the same time.

After the function and the condition data set are written in the second storage unit 51b, the third computing unit 63 reads out the function and the condition data set from the second storage unit 51b. In addition, without provision (without interposition) of the second storage unit 51b, the function may be output from the first computing unit 61 to the third computing unit 63, and the condition data set may be output from the second computing unit 62 to the third computing unit 63. The third computing unit 63 to which the function and the condition data set are input in this way calculates a prediction result using the function for each reaction condition of the read-out condition data set. Then, the prediction data set including a plurality of pieces of prediction information in which the reaction conditions and the prediction results are associated with each other is generated (Step ST5). The third computing unit 63 writes the generated prediction data set to the third storage unit 51c.

Since the prediction result is calculated for each reaction condition of the condition data set, the number of pieces of prediction information of the generated prediction data set is 11,990,000 in the present embodiment, like the number of reaction conditions of the condition data set.

The third computing unit 63 specifies the prediction information indicating the "best prediction result" by comparing the target result RA that is input in advance and the prediction result of each piece of prediction information of the prediction data set (Step ST6). The reaction condition of the specified prediction information is extracted as the extracted reaction condition CP (Step ST7), and the prediction information consisting of the extracted reaction condition CP and the prediction result RP corresponding to the extracted reaction condition CP is written in the third storage unit Sic as the extracted reaction condition CP and the prediction result RP associated with the extracted reaction condition CP in the prediction data set.

After the extracted reaction condition CP is written in the third storage unit 51c, the setting unit 16 reads out the extracted reaction condition CP from the third storage unit 51c. The extracted reaction condition CP may be output from the third computing unit 63 to the setting unit 16 without provision (without interposition) of the third storage unit 51c. The setting unit 16 to which the extracted reaction condition CP is input in this way causes the flow reactors 11 and 41 to try the flow reaction process under the extracted reaction condition CP (Step ST8). Then, the measurement result RR that is the reaction result of the trial is output to the determination unit 56 by the detecting unit 17.

The prediction result RP associated with the extracted reaction condition CP written in the third storage unit 51c is read out by the determination unit 56. The prediction result RP may be output from the third computing unit 63 to the determination unit 56 without interposition of the third storage unit 51*c*. The determination unit 56 to which the prediction. result RP is input in this way compares the prediction result RP with the measurement result RR (Step ST9) to obtain the degree of difference DR.

Next, the determination unit 56 determines, based on an allowable range DT of the degree of difference (1% in the present embodiment) that is input in advance from the setting unit 16. whether or not the degree of difference DR is within the allowable range DT (Step ST10). In a case where it is determined that the degree of difference DR is within the allowable range DT (Step ST10: YES), the determination unit 56 writes the extracted reaction condition CP in the third storage unit 51*c* as the determined reaction condition CS, and the determination unit 56 of the present embodiment further writes the reaction condition group of the prediction data set stored in the third storage unit 51*c* in the third storage unit 51*c* as a reaction data set to be used in the flow reaction process of the flow reactor 11 (Step ST11).

After the extracted reaction condition CP is written as the determined reaction condition CS, the setting unit 16 sets the reaction condition in the flow reactor 11 to the determined reaction condition CS, and then, the flow reactor 11 performs a flow reaction (Step ST12), Since the determined reaction condition CS is a reaction condition that is already determined to obtain a reaction result that is extremely close to the measurement result RR, the product is obtained with a target molecular weight and a target dispersity. Further, the determined reaction condition CS is obtained using a computing from a huge number of reaction conditions of, for example, 11,990,000 in the present embodiment, and the trial and time of the flow reaction process are greatly shortened as compared with the related art.

On the other hand, in a case where it is determined that the degree of difference DR is not within the allowable range DT (Step ST10: NO), the determination unit 56 reads out the extracted reaction condition CP from the third storage unit 51*c*, and generates reaction information in which the extracted reaction condition CP and the measurement result RR are associated with each other. The generated reaction information is included in the data set stored in the first storage unit 51*a*, as learning data (Step ST13), and the data set of the learning data in the first storage unit 51*a* is rewritten to the second data set. By this rewriting, the first storage unit 51*a* stores a data set in which the number of pieces of learning data is one more than that of the previous data set. Further, the determination unit 56 updates the number of connection weights of the neural network 70 so that $Mj-1 \leq Mj < Nj/2$ (Step ST14). Then, the processes of Steps ST3 to ST10 are repeated until Step ST10 is positive.

FIG. 12 is a diagram showing a verification result of learning accuracy of the neural network in the present embodiment. In FIG. 12, in a case where a neural network having a total number of connection weights of 21 shown in FIG. 4 is used, indexes of learning accuracy in a case where the number of pieces of learning data included in the data set is 250, 100, and 42 are shown as Examples 1 to 3. Further, an index of learning accuracy in a case where the number of pieces of learning data included in the data set is 10, is shown as a comparative example. As an index of learning accuracy, a coefficient of determination $R^2$, which represents the correlation between the dispersity and the molecular weight of the reaction result obtained by the neural network from the learning data included in the data set of each example, and the dispersity and the molecular weight of the actually measured reaction result obtained by the reaction conditions of the learning data, was used. In the present embodiment, a coefficient of determination $R^2$ of 0.8 or more is regarded as acceptable. As shown in FIG., 12, in the comparative example, both the coefficients of determination of the dispersity and the molecular weight were unacceptable. On the other hand, in Examples 1 to 3, both the coefficients of determination of the dispersity and the molecular weight were acceptable. Therefore, it can be seen from FIG. 12 that in a case where the number of pieces of learning data is set to be at least twice the total number M0 of connection weights of the neural network, the neural network can be trained accurately.

FIG. 13 is a diagram showing a relationship between the number of pieces of learning data included in a data, set in the present embodiment and the number of neural network connections. In FIG. 13, j is the number of times of learning and 0 shows the learning with the initial data set. As shown in FIG. 13, in the present embodiment, the number of pieces of learning data included in the data set is updated to 57 and the number of nodes in the hidden layer of the neural network is updated to 4 after the completion of the 14th learning. Learning was continued from the 14th time onward, and at the time of the 70th learning, the degree of difference DR was within the allowable range DT, and the flow reaction process was performed under the extracted reaction condition in the 70th time.

As described above, in the present embodiment, an appropriate number of pieces of learning data can be generated by appropriately setting the total number M0 of the connection weights of the neural network. Therefore, according to the present embodiment, in a case where an unknown reaction condition is input by using the generated data set, it is possible to efficiently train a neural network that outputs a reaction result corresponding to the unknown reaction condition. Therefore, according to the present embodiment, the conditions for the flow reaction process can be appropriately set.

Further, in the present embodiment, since the condition setting can be performed easily in a flow reaction with many condition parameters, the reaction process can be started quickly, and even in a case where one of a plurality of condition parameters has to be changed for any reason, it is possible to perform a new reaction process quickly.

In the above embodiment, two raw materials, a first raw material and a second raw material, are used, but the present disclosure is not limited thereto. The raw material may be three or more kinds. In this case, the flow rate according to the number of raw materials and the shape of the merging portion according to the number of raw materials are added to the reaction conditions as condition parameters. Therefore, the total number of connection weights of the neural network 70 and the number of pieces of learning data included in the data set are also changed. For example, in a case Where three raw materials are used, there are two merging portions, and T-shaped and cross-branched tubes are used for the respective portions. Two types of reaction tubes are also used. Therefore, the number of nodes in the input layer of the neural network 70 is 3 (number of raw materials)+2×2 (number of merging portions×T-shaped tube, cross tube)+2 (reaction path diameter)+1 (reaction temperature)=10. In a case where the number of nodes in the hidden layer is 3 and the number of nodes in the output layer is 2, the total number of connection weights of the neural network is 10×3+3×2=36. In this case, the number of pieces of learning data included in the initial data set is set to 36×2=72 or more and 36×10=360 or less.

Further, in the above embodiment, in a case where the total number of connection weights of the neural network is M0, a data set including learning data of 2×M0 or more is generated to train the neural network, but the present disclosure is not limited thereto. A data set including a random number of pieces of learning data may be generated to train the neural network.

Further, in the above embodiment, the present disclosure is applied to the flow reaction process, but the present disclosure is not limited thereto. The present disclosure is applicable to various production processes that produce products. Specifically, the present disclosure can be applied to the film transport process described in JP2013-129540A, the coating process of the optically anisotropic layer in the manufacturing process of the optical compensation sheet described in JP2007-52049A, the vacuum film forming process in the manufacturing process of the gas barrier film described in JP2011-006788A, and the like.

For example, the film transport process includes a film winding process, as the process conditions corresponding to the reaction conditions in the flow reaction process, (1) film winding tension, (2) tension change timing at the time of winding, (3) winding speed, and (4) air press pressure can be used, and as the production result corresponding to the reaction result, (1) the amount of winding deviation and (2) the black belt can be used. In this case, as the configuration of the neural network, the number of nodes in the input layer is 4, and the number of nodes in the output layer is 2. In a case where the hidden layer is one layer and has three nodes, the total number of connection weights of the neural network is 4×3+3×2=18, so that the number of pieces of learning data included in the initial data set is 36 or more and 180 or less.

Further, in the coating process of the optically anisotropic layer in the manufacturing process of the optical compensation sheet, as process conditions, (1) set coating film thickness (line speed, wire bar count), (2) rubbing rotation speed, (3) heating zone temperature, (4) UV irradiation output, and (5) film surface temperature at the time of UV irradiation can be used, and as a production result, (1) retardation variation can be used. In this case, as the configuration of the neural network, the number of nodes in the input layer is 5, and the number of nodes in the output layer is 1. In a case where the hidden layer is one layer and has three nodes, the total number of connection weights of the neural network is 5×3+3×1=18, so that the number of pieces of learning data included in the initial data set is 36 or more and 180 or less.

Further, in the vacuum film forming process in the manufacturing process of the gas harrier film, as process conditions, (1) raw material gas supply flow rate, (2) applied power, and (3) film formation pressure can be used, and as the production result, (1) water vapor transmission rate can be used. In this case, as the configuration of the neural network, the number of nodes in the input layer is 3, and the number of nodes in the output layer is I.

In a case where the hidden layer is one layer and has three nodes, the total number of connection weights of the neural network is 3×3+3×1=12, so that the number of pieces of learning data included in the initial data set is 24 or more and 120 or less.

In each of the above embodiments, the hardware structures of processing units that execute various processes such as the first computing unit 61 to the third computing unit 63 of the computing section 50, the support apparatus 12, the data generation device 13, and the system controller 15 are various processors as follows. The various processors include a central processing unit (CPU) that is a general-purpose processor that functions as various processing units by executing software (program), a programmable logic device (PLD) that is a processor whose circuit configuration can be changed after manufacture, such as field programmable gate array (FPGA), a dedicated electrical circuit that is a processor having a circuit configuration designed exclusively for executing a specific process such as an application specific integrated circuit (ASIC), and the like.

One processing unit may be configured by one of various processors, or may be configured by two or more processors of the same type or different types (for example, a combination of a plurality of FPGAs or a combination of a CPU and an FPGA). In addition, a plurality of processing units may be configured by one processor. As an example of configuring a plurality of processing units by one processor, first, as represented by a computer, such as a client or a server, there is a form in which one processor is configured by a combination of one or more CPUs and software and this processor functions as a plurality of processing units. Second, as represented by a system on chip (SoC) or the like, there is a form of using a processor for realizing the function of the entire system including a plurality of processing units with one integrated circuit (IC) chip. Thus, various processing units are configured by using one or more of the above-described various processors as a hardware structure.

Furthermore, the hardware structure of these various processors is, more specifically, an electric circuit (circuitry) in which circuit elements such as semiconductor elements are combined.

EXPLANATION OF REFERENCES

- 10: flow reaction facility
- 11, 41: flow reactor
- 12: support apparatus
- 13: data generation device
- 15: system controller
- 16: setting unit
- 17: detecting unit
- 21: first supply unit
- 22: second supply unit
- 23, 43: reaction section
- 26: collecting section
- 31, 42: merging portion
- 31a to 31c: first tube part to third tube part
- 32: reaction portion
- 33: temperature control unit
- 50: computing section
- 51a to 51c: first storage unit to third storage unit
- 52: reaction condition setting unit
- 53: reaction result acquisition unit
- 54: generation unit
- 56: determination unit
- 61 to 63: first computing unit to third computing unit
- 70: neural network
- CP: extracted reaction condition
- CS: determined reaction condition
- DT: allowable range
- DR: degree of difference
- L1: input layer
- L2: interlayer
- L3: output layer
- xi, x1 to x5: condition parameter values
- ul, u1 to u3: node values
- ym, y1 and y2: result parameter values
- $w_{xiul}$, $w_{x1u1}$ to $w_{x5u3}$, $w_{ulym}$, $w_{u1y1}$ to $w_{u3y2}$: weighting coefficients
- RA: target result
- RP: prediction result
- RR: measurement result

What is claimed is:

1. A learning device for training a neural network in which a plurality of layers are connected by a plurality of connection weights, the neural network outputting a production result corresponding to a process condition in a case where the process condition is input in a process for producing a product, the learning device comprising a processor configured to:

perform a first computation for deriving the connection weight of the neural network by using a data set generated by a data generation device, in a flow reaction process for producing the product by reacting a raw material while the raw material is flowing, for quick reaction process, that generates the data set consisting of a plurality of pieces of learning data for training a neural network in which a plurality of layers are connected by a plurality of connection weights, the neural network outputting a production result corresponding to a process condition in a case where the process condition including flow velocity of the raw material is input for producing the product, the data generation device comprising a processor configured to:

set an upper limit and a lower limit of the process condition;

regarding the flow velocity, assuming that a total number of the connection weights of the neural network is $M0$, set a plurality of the process conditions of $2 \times M0$ or more in the range of the upper limit and the lower limit;

acquire a production result corresponding to each of the plurality of process conditions, which is derived by producing the product under each of the plurality of process conditions; and generate the plurality of pieces of learning data consisting of each of the plurality of process conditions and the production result corresponding to the process condition as the data set;

perform a second computation for calculating a prediction result for each process condition of a condition data set having a plurality of process conditions whose production results are unknown using the neural network in which the connection weight is computed to generate a prediction data set in which the process condition and the prediction result are associated with each other, specifying the prediction result closest to a preset target result among a plurality of the obtained prediction results, and extracting a process condition associated with the specified prediction result as an extracted process condition; and assuming that the number of the data sets is $Nj$ and the number of the connection weights of the neural network is $Mj$, determine whether or not a degree of difference between the production result in a case where the product is produced under the extracted process condition and the prediction result associated with the extracted process condition is within a preset allowable range, and in a case where the determination is negative, update the number $Nj$ of the data sets by adding, to the data set, production information in which the extracted process condition is associated with the production result in a case where the production is performed under the extracted process condition as the learning data, and update the number $Mj$ of new connection weights of the neural network so that $Mj-1 \leq Mj < Nj/2$, and in a case where the determination is positive, determine that the extracted process condition is a process condition used for the process, wherein the first computation, the second computation, and the determination are repeated until the determination is positive based on the updated data set and the neural network whose connection weights are updated.

2. A learning device for training a neural network in which a plurality of layers are connected by a plurality of connection weights, in a flow reaction process for producing a product by reacting a raw material while the raw material is flowing, for quick reaction process, the neural network outputting a production result corresponding to a process condition in a case where the process condition including flow velocity of a raw material is input, the learning device comprising a processor configured to:

perform a first computation for deriving the connection weight of the neural network by using a data set consisting of a plurality of pieces of learning data consisting of each of the plurality of process conditions and the production result corresponding to the process condition;

perform a second computation for calculating a prediction result for each process condition of a condition data set having a plurality of process conditions whose production results are unknown using the neural network in which the connection weight is computed to generate a prediction data set in which the process condition and the prediction result are associated with each other, specifying the prediction result closest to a preset target result among a plurality of the obtained prediction results, and extracting a process condition associated with the specified prediction result as an extracted process condition; and assuming that the number of the data sets is $Nj$ and the number of the connection weights of the neural network is $Mj$, determine whether or not a degree of difference between the production result in a case where the product is produced under the extracted process condition and the prediction result associated with the extracted process condition is within a preset allowable range, and in a case where the determination is negative, update the number $Nj$ of the data sets by adding, to the data set, production information in which the extracted process condition is associated with the production result in a case where the production is performed under the extracted process condition as the learning data, and update the number $Mj$ of new connection weights of the neural network so that $Mj-1 \leq Mj < Nj/2$, and in a case where the determination is positive, determine that the extracted process condition is a process condition used for the process, wherein the first computation, the second computation, and the determination are repeated until the determination is positive based on the updated data set and the neural network whose connection weights are updated.

3. A learning method for training a neural network in which a plurality of layers are connected by a plurality of connection weights, the neural network outputting a production result corresponding to a process condition in a case where the process condition is input in a process for producing a product, the learning method comprising:

performing a first computation for deriving the connection weight of the neural network by using a data set generated by a data generation method, in a flow reaction process for producing the product by reacting a raw material while the raw material is flowing, for quick reaction process, for generating the data set consisting of a plurality of pieces of learning data for training a neural network in which a plurality of layers are connected by a plurality of connection weights, the neural network outputting a production result corresponding to a process condition in a case where the process condition including flow velocity of the raw material is input for producing the product, the data generation method comprising:

setting an upper limit and a lower limit of the process condition;

regarding the flow velocity, assuming that a total number of the connection weights of the neural network is $M0$, setting a plurality of the process conditions of $2 \times M0$ or more in the range of the upper limit and the lower limit;

acquiring a production result corresponding to each of the plurality of process conditions, which is derived by producing the product under each of the plurality of process conditions; and generating the plurality of pieces of learning data consisting of each of the plurality of process conditions and the production result corresponding to the process condition as the data set;

performing a second computation for calculating a prediction result for each process condition of a condition data set having a plurality of process conditions whose production results are unknown using the neural network in which the connection weight is computed to generate a prediction data set in which the process condition and the prediction result are associated with each other;

specifying the prediction result closest to a preset target result among a plurality of the obtained prediction results, and extracting a process condition associated with the specified prediction result as an extracted process condition; and assuming that the number of the data sets is $Nj$ and the number of the connection weights of the neural network is $Mj$, determining whether or not a degree of difference between the production result in a case where the product is produced under the extracted process condition and the prediction result associated with the extracted process condition is within a preset allowable range, and in a case where the determination is negative, updating the number $Nj$ of the data sets by adding, to the data set, production information in which the extracted process condition is associated with the production result in a case where the production is performed under the extracted process condition as the learning data, and updating the number $Mj$ of new connection weights of the neural network so that $Mj-1 \leq Mj < Nj/2$, and in a case where the determination is positive, determining that the extracted process condition is a process condition used for the process, wherein the first computation, the second computation, and the determination are repeated until the determination is positive based on the updated data set and the neural network whose connection weights are updated.

4. A learning method for training a neural network in which a plurality of layers are connected by a plurality of connection weights, in a flow reaction process for producing a product by reacting a raw material while the raw material is flowing, for quick reaction process, the neural network outputting a production result corresponding to a process condition in a case where the process condition including flow velocity of a raw material is input, the learning method comprising:

performing a first computation for deriving the connection weight of the neural network by using a data set consisting of a plurality of pieces of learning data consisting of each of the plurality of process conditions and the production result corresponding to the process condition;

performing a second computation for calculating a prediction result for each process condition of a condition data set having a plurality of process conditions whose production results are unknown using the neural network in which the connection weight is computed to generate a prediction data set in which the process condition and the prediction result are associated with each other, specifying the prediction result closest to a preset target result among a plurality of the obtained prediction results, and extracting a process condition associated with the specified prediction result as an extracted process condition; and assuming that the number of the data sets is $Nj$ and the number of the connection weights of the neural network is $Mj$, determining whether or not a degree of difference between the production result in a case where the product is produced under the extracted process condition and the prediction result associated with the extracted process condition is within a preset allowable range, and in a case where the determination is negative, updating the number $Nj$ of the data sets by adding, to the data set, production information in which the extracted process condition is associated with the production result in a case where the production is performed under the extracted process condition as the learning data, and updating the number $Mj$ of new connection weights of the neural network so that $Mj-1 \leq Mj < Nj/2$, and in a case where the determination is positive, determining that the extracted process condition is a process condition used for the process, wherein the first computation, the second computation, and the determination are repeated until the determination is positive based on the updated data set and the neural network whose connection weights are updated.

* * * * *